(12) United States Patent
Luo

(10) Patent No.: US 12,554,443 B2
(45) Date of Patent: *Feb. 17, 2026

(54) SYSTEM AND APPARATUS FOR REDUNDANT ARRAY OF INDEPENDENT DISKS STRIPING AGAINST PROGRAMMING FAILURES

(71) Applicant: YANGTZE MEMORY TECHNOLOGIES CO., LTD., Wuhan (CN)

(72) Inventor: Xianwu Luo, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,793

(22) Filed: Mar. 13, 2024

(65) Prior Publication Data

US 2024/0220169 A1    Jul. 4, 2024

Related U.S. Application Data

(63) Continuation of application No. 17/488,807, filed on Sep. 29, 2021, now Pat. No. 11,972,155, which is a
(Continued)

(51) Int. Cl.
*G06F 11/00* (2006.01)
*G06F 3/06* (2006.01)
*G06F 11/10* (2006.01)

(52) U.S. Cl.
CPC .......... *G06F 3/0689* (2013.01); *G06F 3/0604* (2013.01); *G06F 3/0655* (2013.01); *G06F 11/108* (2013.01)

(58) Field of Classification Search
CPC .................................................. G06F 11/108
See application file for complete search history.

(56) References Cited

U.S. PATENT DOCUMENTS

| 5,619,642 A | 4/1997 | Nielson et al. |
| 8,924,776 B1 | 12/2014 | Mollow et al. |
| (Continued) | | |

FOREIGN PATENT DOCUMENTS

| CN | 104272261 A | 1/2015 |
| CN | 105009066 A | 10/2015 |
| (Continued) | | |

OTHER PUBLICATIONS

International Search Report issued in corresponding International Application No. PCT/CN2021/115593, mailed on May 27, 2022, 5 pages.

*Primary Examiner* — Amine Riad
(74) *Attorney, Agent, or Firm* — BAYES PLLC

(57) ABSTRACT

A memory system includes a memory device configured to store memory data. The memory device includes an array of memory cells, and a plurality of word lines arranged in a plurality of rows and coupled to the array of memory cells. The memory system also includes a memory controller coupled to the array of memory cells. The memory controller is configured to receive the memory data and first parity data of the memory data, perform a redundant array of independent disks (RAID) encode operation on the memory data and the first parity data to form second parity data, and perform a write operation to store the memory data, the first parity data, and the second parity data into the array of memory cells.

20 Claims, 13 Drawing Sheets

Related U.S. Application Data continuation of application No. PCT/CN2021/115593, filed on Aug. 31, 2021.

(56) References Cited

U.S. PATENT DOCUMENTS

| | | | |
|---|---|---|---|
| 9,152,499 B1* | 10/2015 | Mollov | G06F 11/1076 |
| 9,513,994 B2* | 12/2016 | Bonwick | G06F 3/064 |
| 9,836,224 B2* | 12/2017 | Seo | G06F 11/1076 |
| 10,289,491 B1* | 5/2019 | Ho | G06F 3/0688 |
| 10,453,973 B2 | 10/2019 | Bang et al. | |
| 10,467,094 B2* | 11/2019 | Kim | G06F 11/142 |
| 10,521,304 B1 | 12/2019 | Reddy et al. | |
| 10,649,867 B2 | 5/2020 | Roberts et al. | |
| 2017/0293527 A1 | 10/2017 | Shappir et al. | |
| 2020/0272540 A1 | 8/2020 | Sun et al. | |
| 2021/0117123 A1 | 4/2021 | Jakowski et al. | |

FOREIGN PATENT DOCUMENTS

| | | | |
|---|---|---|---|
| CN | 105045525 A | 11/2015 |
| CN | 108073357 A | 10/2017 |
| CN | 108062258 A | 5/2018 |
| CN | 109426583 A | 3/2019 |
| CN | 113168866 A | 7/2021 |

\* cited by examiner

| D0-0-0 | D1-0-0 | D2-0-0 | D3-0-0 | D4-0-0 | ••• | D126-0-0 |
|---|---|---|---|---|---|---|
| D0-1-0 | D1-1-0 | D2-1-0 | D3-1-0 | D4-1-0 | ••• | D126-1-0 |
| D0-2-0 | D1-2-0 | D2-2-0 | D3-2-0 | D4-2-0 | ••• | D126-2-0 |
| D0-3-0 | D1-3-0 | D2-3-0 | D3-3-0 | D4-3-0 | ••• | D126-3-0 |
| D0-4-0 | D1-4-0 | D2-4-0 | D3-4-0 | D4-4-0 | ••• | D126-4-0 |
| ••• | ••• | ••• | ••• | ••• | ••• | ••• |
| D0-35-0 | D1-35-0 | D2-35-0 | D3-35-0 | D4-35-0 | ••• | D126-35-0 |
| P0-36-0 | P1-36-0 | P2-36-0 | P3-36-0 | P4-36-0 | ••• | P126-36-0 |

FIG. 7A

| D0-0-126 | D1-0-126 | D2-0-126 | D3-0-126 | D4-0-126 | ••• | D126-0-126 |
|---|---|---|---|---|---|---|
| D0-1-126 | D1-1-126 | D2-1-126 | D3-1-126 | D4-1-126 | ••• | D126-1-126 |
| D0-2-126 | D1-2-126 | D2-2-126 | D3-2-126 | D4-2-126 | ••• | D126-2-126 |
| D0-3-126 | D1-3-126 | D2-3-126 | D3-3-126 | D4-3-126 | ••• | D126-3-126 |
| D0-4-126 | D1-4-126 | D2-4-126 | D3-4-126 | D4-4-126 | ••• | D126-4-126 |
| ••• | ••• | ••• | ••• | ••• | ••• | ••• |
| D0-35-126 | D1-35-126 | D2-35-126 | D3-35-126 | D4-35-126 | ••• | D126-35-126 |
| P0-36-126 | P1-36-126 | P2-36-126 | P3-36-126 | P4-36-126 | ••• | P126-36-126 |

FIG. 7B

| D0-0-0 | D0-0-1 | D0-0-2 | D0-0-3 | D0-0-4 | ••• | D0-0-126 | P0-0-127 |
|---|---|---|---|---|---|---|---|

FIG. 7C

| D1-0-0 | D1-0-1 | D1-0-2 | D1-0-3 | D1-0-4 | ••• | D1-0-126 | P1-0-127 |
|---|---|---|---|---|---|---|---|

FIG. 7D

| D0-0-0 | D1-0-0 | D2-0-0 | D3-0-0 | D4-0-0 | ... | D126-0-0 | D127-0-0 |
|---|---|---|---|---|---|---|---|
| D0-1-0 | D1-1-0 | D2-1-0 | D3-1-0 | D4-1-0 | ... | D126-1-0 | D127-1-0 |
| D0-2-0 | D1-2-0 | D2-2-0 | D3-2-0 | D4-2-0 | ... | D126-2-0 | D127-2-0 |
| D0-3-0 | D1-3-0 | D2-3-0 | D3-3-0 | D4-3-0 | ... | D126-3-0 | D127-3-0 |
| D0-4-0 | D1-4-0 | D2-4-0 | D3-4-0 | D4-4-0 | ... | D126-4-0 | D127-4-0 |
| ... | ... | ... | ... | ... | ... | ... | ... |
| D0-35-0 | D1-35-0 | D2-35-0 | D3-35-0 | D4-35-0 | ... | D126-35-0 | D127-35-0 |

FIG. 8A

| D0-0-126 | D1-0-126 | D2-0-126 | D3-0-126 | D4-0-126 | ... | D126-0-126 | D127-0-126 |
|---|---|---|---|---|---|---|---|
| D0-1-126 | D1-1-126 | D2-1-126 | D3-1-126 | D4-1-126 | ... | D126-1-126 | D127-1-126 |
| D0-2-126 | D1-2-126 | D2-2-126 | D3-2-126 | D4-2-126 | ... | D126-2-126 | D127-2-126 |
| D0-3-126 | D1-3-126 | D2-3-126 | D3-3-126 | D4-3-126 | ... | D126-3-126 | D127-3-126 |
| D0-4-126 | D1-4-126 | D2-4-126 | D3-4-126 | D4-4-126 | ... | D126-4-126 | D127-4-126 |
| ... | ... | ... | ... | ... | ... | ... | ... |
| D0-35-126 | D1-35-126 | D2-35-126 | D3-35-126 | D4-35-126 | ... | D126-35- | D127-35-126 |

FIG. 8B

| P0-36-0 | P1-36-0 | P2-36-0 | P3-36-0 | P4-36-0 | ... | P126-36-0 | P127-36-0 |
|---|---|---|---|---|---|---|---|
| P0-36-1 | P1-36-1 | P2-36-1 | P3-36-1 | P4-36-1 | ... | P126-36-1 | P127-36-1 |
| P0-36-2 | P1-36-2 | P2-36-2 | P3-36-2 | P4-36-2 | ... | P126-36-2 | P127-36-2 |
| P0-36-3 | P1-36-3 | P2-36-3 | P3-36-3 | P4-36-3 | ... | P126-36-3 | P127-36-3 |
| P0-36-4 | P1-36-4 | P2-36-4 | P3-36-4 | P4-36-4 | ... | P126-36-4 | P127-36-4 |
| ... | ... | ... | ... | ... | ... | ... | ... |
| P0-36-126 | P1-36-126 | P2-36-126 | P3-36-126 | P4-36-126 | ... | P126-36-126 | P127-36-126 |

FIG. 8C

| P0-0-127 | P1-0-127 | P2-0-127 | P3-0-127 | P4-0-127 | ... | P126-0-127 | P127-0-127 |
|---|---|---|---|---|---|---|---|
| P0-1-127 | P1-1-127 | P2-1-127 | P3-1-127 | P4-1-127 | ... | P126-1-127 | P127-1-127 |
| P0-2-127 | P1-2-127 | P2-2-127 | P3-2-127 | P4-2-127 | ... | P126-2-127 | P127-2-127 |
| P0-3-127 | P1-3-127 | P2-3-127 | P3-3-127 | P4-3-127 | ... | P126-3-127 | P127-3-127 |
| P0-4-127 | P1-4-127 | P2-4-127 | P3-4-127 | P4-4-127 | ... | P126-4-127 | P127-4-127 |
| ... | ... | ... | ... | ... | ... | ... | ... |
| P0-35-127 | P1-35-127 | P2-35-127 | P3-35-127 | P4-35-127 | ... | P126-35-127 | P127-35-127 |

FIG. 8D

| D0-0-0 | D1-0-0 | D2-0-0 | D3-0-0 | D4-0-0 | ••• | D126-0-0 | P127-0-0 |
|---|---|---|---|---|---|---|---|
| D0-1-0 | D1-1-0 | D2-1-0 | D3-1-0 | D4-1-0 | ••• | D126-1-0 | P127-1-0 |
| D0-2-0 | D1-2-0 | D2-2-0 | D3-2-0 | D4-2-0 | ••• | D126-2-0 | P127-2-0 |
| D0-3-0 | D1-3-0 | D2-3-0 | D3-3-0 | D4-3-0 | ••• | D126-3-0 | P127-3-0 |
| D0-4-0 | D1-4-0 | D2-4-0 | D3-4-0 | D4-4-0 | ••• | D126-4-0 | P127-4-0 |
| ••• | ••• | ••• | ••• | ••• | ••• | ••• | ••• |
| D0-35-0 | D1-35-0 | D2-35-0 | D3-35-0 | D4-35-0 | ••• | D126-35-0 | P127-35-0 |

FIG. 9A

| D0-0-0 | D1-0-0 | D2-0-0 | D3-0-0 | D4-0-0 | ••• | D126-0-0 |
|---|---|---|---|---|---|---|
| D0-1-0 | D1-1-0 | D2-1-0 | D3-1-0 | D4-1-0 | ••• | D126-1-0 |
| D0-2-0 | D1-2-0 | D2-2-0 | D3-2-0 | D4-2-0 | ••• | D126-2-0 |
| D0-3-0 | D1-3-0 | D2-3-0 | D3-3-0 | D4-3-0 | ••• | D126-3-0 |
| D0-4-0 | D1-4-0 | D2-4-0 | D3-4-0 | D4-4-0 | ••• | D126-4-0 |
| ••• | ••• | ••• | ••• | ••• | ••• | ••• |
| D0-35-0 | D1-35-0 | D2-35-0 | D3-35-0 | D4-35-0 | ••• | D126-35-0 |
| P0-36-0 | P1-36-0 | P2-36-0 | P3-36-0 | P4-36-0 | ••• | P126-36-0 |

FIG. 9B

| D0-0-0 | D1-0-0 | D2-0-0 | D3-0-0 | D4-0-0 | ••• | D126-0-0 |
|---|---|---|---|---|---|---|
| D0-1-0 | D1-1-0 | D2-1-0 | D3-1-0 | D4-1-0 | ••• | D126-1-0 |
| D0-2-0 | D1-2-0 | D2-2-0 | D3-2-0 | D4-2-0 | ••• | D126-2-0 |
| D0-3-0 | D1-3-0 | D2-3-0 | D3-3-0 | D4-3-0 | ••• | D126-3-0 |
| D0-4-0 | D1-4-0 | D2-4-0 | D3-4-0 | D4-4-0 | ••• | D126-4-0 |
| ••• | ••• | ••• | ••• | ••• | ••• | ••• |
| D0-35-0 | D1-35-0 | D2-35-0 | D3-35-0 | D4-35-0 | ••• | D126-35-0 |

FIG. 9C

| P0-0-127 | P1-0-127 | P2-0-127 | P3-0-127 | P4-0-127 | ••• | P126-0-127 |
|---|---|---|---|---|---|---|
| P0-1-127 | P1-1-127 | P2-1-127 | P3-1-127 | P4-1-127 | ••• | P126-1-127 |
| P0-2-127 | P1-2-127 | P2-2-127 | P3-2-127 | P4-2-127 | ••• | P126-2-127 |
| P0-3-127 | P1-3-127 | P2-3-127 | P3-3-127 | P4-3-127 | ••• | P126-3-127 |
| P0-4-127 | P1-4-127 | P2-4-127 | P3-4-127 | P4-4-127 | ••• | P126-4-127 |
| ••• | ••• | ••• | ••• | ••• | ••• | ••• |
| P0-35-127 | P1-35-127 | P2-35-127 | P3-35-127 | P4-35-127 | ••• | P126-35-127 |

FIG. 9D

SYSTEM AND APPARATUS FOR
REDUNDANT ARRAY OF INDEPENDENT
DISKS STRIPING AGAINST
PROGRAMMING FAILURES

CROSS-REFERENCE TO RELATED
APPLICATIONS

This application is a continuation of U.S. application Ser. No. 17/488,807, filed on Sep. 29, 2021, which is a continuation of International Application No. PCT/CN2021/115593, filed on Aug. 31, 2021, entitled "SYSTEM AND APPARATUS FOR REDUNDANT ARRAY OF INDEPENDENT DISKS STRIPING AGAINST PROGRAMMING FAILURES," both of which are hereby incorporated by reference in their entireties.

BACKGROUND

The present disclosure relates to data storage system and apparatus.

With the rapid growth of the Internet and various mission-critical applications, the importance of preserving data integrity and ensuring continuous access to critical information cannot be overstated. To satisfy the needs in preserving and accessing reliable data, a redundant array of independent disks (RAID) algorithm has been used to improve the performance, reliability, power consumption, and scalability in NAND memory devices. RAID algorithm employs the techniques of striping, mirroring, and/or parity to create large reliable data stores from multiple storage units.

Amongst the different levels of RAIDs, level 5 of RAID, a.k.a. RAID 5, is commonly used in preserving data integrity in NAND memory devices. RAID 5 employs block-level striping with distributed parity (e.g., redundant information). The parity information is distributed among the drives. Upon failure of a single drive, the data in the failed drive can be retrieved from the distributed parity and the rest of the drives such that no memory data is lost.

SUMMARY

In one example, a system includes a memory device for storing memory data. The memory device includes an array of memory cells and a plurality of word lines arranged in a plurality of rows and coupled to the array of memory cells. The system also includes a memory controller, having a processor and a memory, operatively coupled to the array of memory cells. The system further includes a host, having another processor and another memory, operatively coupled to the memory controller. The other processor of the host is configured to perform a first RAID encode operation on memory data to form first parity data. The processor of the memory controller is configured to receive the first parity data and the memory data, and perform a second RAID encode operation on the first parity data and the memory data to form second parity data.

In another example, a memory controller includes a processor and a memory, operatively coupled to a plurality of memory cells for storing memory data; the memory cells being coupled to a plurality of word lines arranged in a plurality of rows. The processor is configured to receive memory data and first parity data of the memory data; perform a RAID encode operation on the memory data and the first parity data to form second parity data, and perform a write operation to store the memory data, the first parity data, and the second parity data into the memory cells.

In another example, a host has a processor and a memory and is operatively coupled to a plurality of memory cells for storing memory data. The memory cells is coupled to a plurality of word lines arranged in a plurality of rows. The processor is configured to receive memory data, perform a RAID encode operation on the memory data to form parity data, and transmit the memory data and the parity data to a memory controller operatively coupled to the plurality of memory cells.

In still another example, a method for operating a memory apparatus using RAID is disclosed. The apparatus includes a plurality of memory cells stored with memory data, a memory controller operatively coupled to the memory cells, and a host operatively coupled to the memory controller. The method includes performing, by the host, a first RAID encode operation on memory data to form first parity data; transmitting the first parity data and the received memory data to the memory controller; and performing, by the memory controller, a second RAID encode operation on the first parity data and the received memory data to form second parity data.

BRIEF DESCRIPTION OF THE DRAWINGS

The accompanying drawings, which are incorporated herein and form a part of the specification, illustrate implementations of the present disclosure and, together with the description, further serve to explain the principles of the present disclosure and to enable a person skilled in the pertinent art to make and use the present disclosure.

FIG. 5 illustrates memory data and parity data arrangement in a three-dimensional view, according to some aspects of the present disclosure.

FIG. 7A and FIG. 7B respectively illustrate the parity data generated in a first array and a Kth array by a first RAID engine, according to some aspects of the present disclosure.

FIG. 7C and FIG. 7D respectively illustrate a stripe and the parity data portion generated for the stripe by the first RAID engine, according to some aspects of the present disclosure.

FIG. 8A and FIG. 8B respectively illustrate the parity data portions generated in a first array and a $K^{th}$ array by a second RAID engine, according to some aspects of the present disclosure.

FIG. 8C and FIG. 8D respectively illustrate the parity data portions generated for the Y-dimensional parity data and the Z-dimensional parity data by the second RAID engine, according to some aspects of the present disclosure.

FIGS. 9A, 9B, 9C, and 9D illustrate examples in which compromised memory data is recovered using a multi-dimensional RAID operation, according to some aspects of the present disclosure.

Figure 1A:
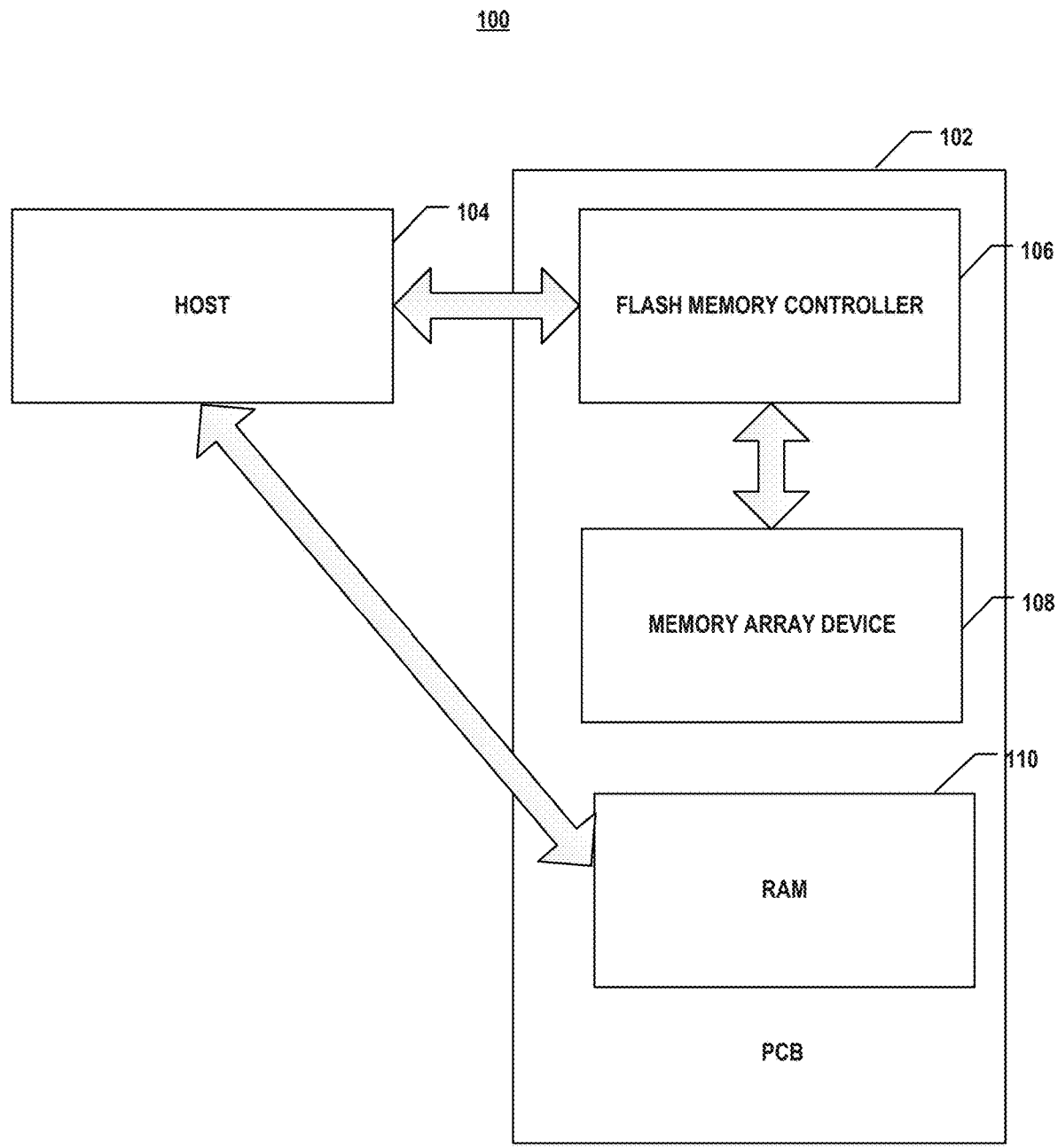
FIG. 1A illustrates a schematic diagram of a system including a host, a Flash memory controller, a random-access memory (RAM), and a memory array device, according to some aspects of the present disclosure.

Aspects of the present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present discloses.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As used herein, the term "memory string" refers to a vertically-oriented string of memory cell transistors connected in series on a laterally-oriented substrate so that the string of memory cell transistors extends in the vertical direction with respect to the substrate. As used herein, the term "vertical/vertically" means perpendicular to the lateral surface of a substrate.

To increase storage capacity, NAND Flash memories often include multiple dies each having multiple planes. Each plane is laterally divided into one or more memory blocks, which are further divided into multiple strings. Each of the strings includes multiple gate conductive layers extending laterally. One memory block includes a number of gate conductive layers stacked vertically in a number of levels, and each gate conductive layer is coupled to memory cells in multiple pages laterally distributed in the strings in the memory block. As the number gate conductive layers continues to increase vertically to increase the storage capacity of the NAND Flash memories, the space between adjacent gate conductive layers becomes smaller. Interferences between adjacent gate conductive layers become prominent. To improve the integrity and readability of the memory cells, RAID 5 has been widely used in NAND Flash memory. Typically, RAID 5 employs striping in memory blocks to divide the memory data in the memory blocks into a plurality of data portions, performing exclusive or (XOR) operations amongst data portions in the stripe to generate respective parity data, and stores the parity data in the memory cells. To minimize interference between adjacent gate conductive layers, data portions coupled to two adjacent gate conductive layers are often in different stripes. One data portion can represent the memory data in one page. One stripe often includes data portions located in two dimensions, e.g., laterally in different memory blocks across different dies and different planes, and vertically in different levels in the same memory blocks. Laterally, the stripe can include data portions at the same positions in different planes. Vertically, the stripe can include data portions at the same positions in different levels. The last data portion often includes the parity data of the stripe. In case of programming failure in one data portion of a stripe, the compromised data portion can be recovered, e.g., by performing XOR operations, using the parity data of the stripe and the rest of the data portions in the stripe. For example, for a stripe that has 128 data portions, 127 data portions are used to store the memory data, and one data portion is used to store the parity data of the stripe, the error correction capability of RAID 5 using such striping configuration can thus be described as (127+1). In other words, one parity data portion protects 127 memory data portions.

However, the RAID 5, e.g., a one-dimensional RAID operation, can be used to recover only one compromised data portion in a stripe. The stripping and the computation of parity data are often performed by a Flash memory controller, which has limited computing resources, e.g., cache capability and computing power. In case of scenarios that cause two or more compromised data portions in a stripe, the RAID 5, with the striping configuration as described above, is incapable of recovering more than one compromised data portion. For example, programming errors, power loss, and/or source-select gate (SSG) leakage failures can cause multiple data portions in a stripe to be compromised. The current striping configuration and the one-dimensional RAID operation are susceptible to having more than one compromised data portion in one stripe (e.g., along one dimension). As a result, memory data in these compromised data portions may be lost. The striping configuration and error correction capability of a memory device need to be improved.

To address one or more aforementioned issues, the present disclosure introduces a solution in which RAID technologies (e.g., RAID 5) can be used to recover more than one compromised data portion laterally and vertically. In these implementations, memory data in a disclosed apparatus is arranged in multiple stripping configurations to facilitate multi-dimensional RAID operation, which allows at least one compromised data portion to be recovered in each dimension. In some implementations, the multi-dimensional RAID operation includes an X-dimensional RAID operation, a Y-dimensional RAID operation, and a Z-dimensional RAID operation, each including a respective encode operation (e.g., for write operation) and a decode operation (e.g., for read operation). In some implementations, RAID 5 is employed for all three dimensions. In some implementations, the directions in which stripes of the three RAID operations extend are orthogonal to one another in a three-dimensional (3D) space. The three RAID operations can be employed alone or in combination to recover one or more compromised data portions. In some implementations, more than three compromised data portions in one dimension can be recovered using the multi-dimensional RAID operation. The error correction capability of the apparatus can be improved.

To facilitate the multi-dimensional RAID operation, memory data are arranged in stripes along the X-dimension, the Y-dimension, and the Z-dimension. Parity data is computed for each stripe of the three dimensions. Different from existing technology, in the present disclosure, the host, operatively coupled to the Flash memory controller, is configured to perform the RAID operation of at least one dimension. In an example, the host is configured to perform the encode and decode operations for the Y-dimensional RAID operation and the Z-dimensional RAID operation. The host has sufficient computing power and caching ability to compute and cache the parity data and the memory data, which are used in the encode and decode operations. Meanwhile, the Flash memory controller, with limited computing resources and caching capability, only needs to compute the X-dimensional RAID operation. While the load of computation is increased due to the multi-dimensional RAID operation, the distribution of load can take advantage of the rich computing resources in the host, improving the computation efficiency without increasing the burden on the Flash memory controller. In some implementations, the RAID operation by the host can be implemented using a software means, such as algorithm and circuitry, and the RAID operation by the Flash memory controller can be implemented using a hardware means, such as a logic circuit. The performance of the apparatus can be improved.

FIG. 1A illustrates a schematic diagram of an apparatus 100 in which the provided methods are operated, according to some aspects of the present disclosure. As shown in FIG. 1A, apparatus 100 includes a host 104, a Flash memory controller 106, a random-access memory (RAM) 110, and memory array device 108. In some implementations, each one of host 104, Flash memory controller 106, memory array device 108, and RAM 110 is a discrete chip with its own packaging and mounted on a printed circuit board (PCB) 102. In some implementations, host 104 is not on the same PCB 102 with Flash memory controller 106, memory array device 108, or RAM 110. In some implementations, RAM 110 may or may not be on the same PCB 102 with Flash memory controller 106 or memory array device 108. The specific packaging and location of host 104 and/or RAM 110 may vary and should not limit the scope of the present disclosure. Host 104 is a specialized processor for performing data processing of memory array device 108. For example, host 104 may include a central processing unit (CPU) and/or a system-on-chip (SoC), such as an application processor. Data is transmitted between host 104 and Flash memory controller 106 and between host 104 and RAM 110 each through a respective interlink, such as a processor bus. Host 104 may thus control the operations of RAM 110 and Flash memory controller 106. memory array device 108 may include arrays of memory cells that are configured in RAID operations. Memory array device 108 is a 3D NAND memory or a 2D NAND memory, which transfers data with Flash memory controller 106 through another interlink. RAM 110 may include any suitable static random-access memory (SRAM) and/or dynamic random-access memory (DRAM).

Flash memory controller 106 can manage the data stored in flash memory (either NAND Flash memory or NOR Flash memory) and communicate with host 104. In some implementations, Flash memory controller 106 is designed for operating in a low duty-cycle environment like Secure Digital (SD) cards, Compact Flash (CF) cards, USB Flash drives, or other media for use in electronic devices, such as personal computers, digital cameras, mobile phones, etc. In some implementations, Flash memory controller 106 is designed for operating in a high duty-cycle environment like solid-state drives (SSDs) or embedded Multi-Media-Cards (eMMCs) used as data storage for mobile devices, such as smartphones, tablets, laptop computers, etc., and enterprise storage arrays. Flash memory controller 106 can be configured to control operations of the memory array device 108, such as read, write, erase, and program operations. Flash memory controller 106 can also be configured to manage various functions with respect to the data stored or to be stored in memory array device 108 including, but not limited to bad-block management, garbage collection, logical-to-physical address conversion, wear leveling, and so on. In some implementations, Flash memory controller 106 is further configured to process error correction codes (ECCs) with respect to the data read from or written to memory array device 108. Any other suitable functions may be performed by Flash memory controller 106 as well, for example, formatting the Flash memory.

Figure 1B:
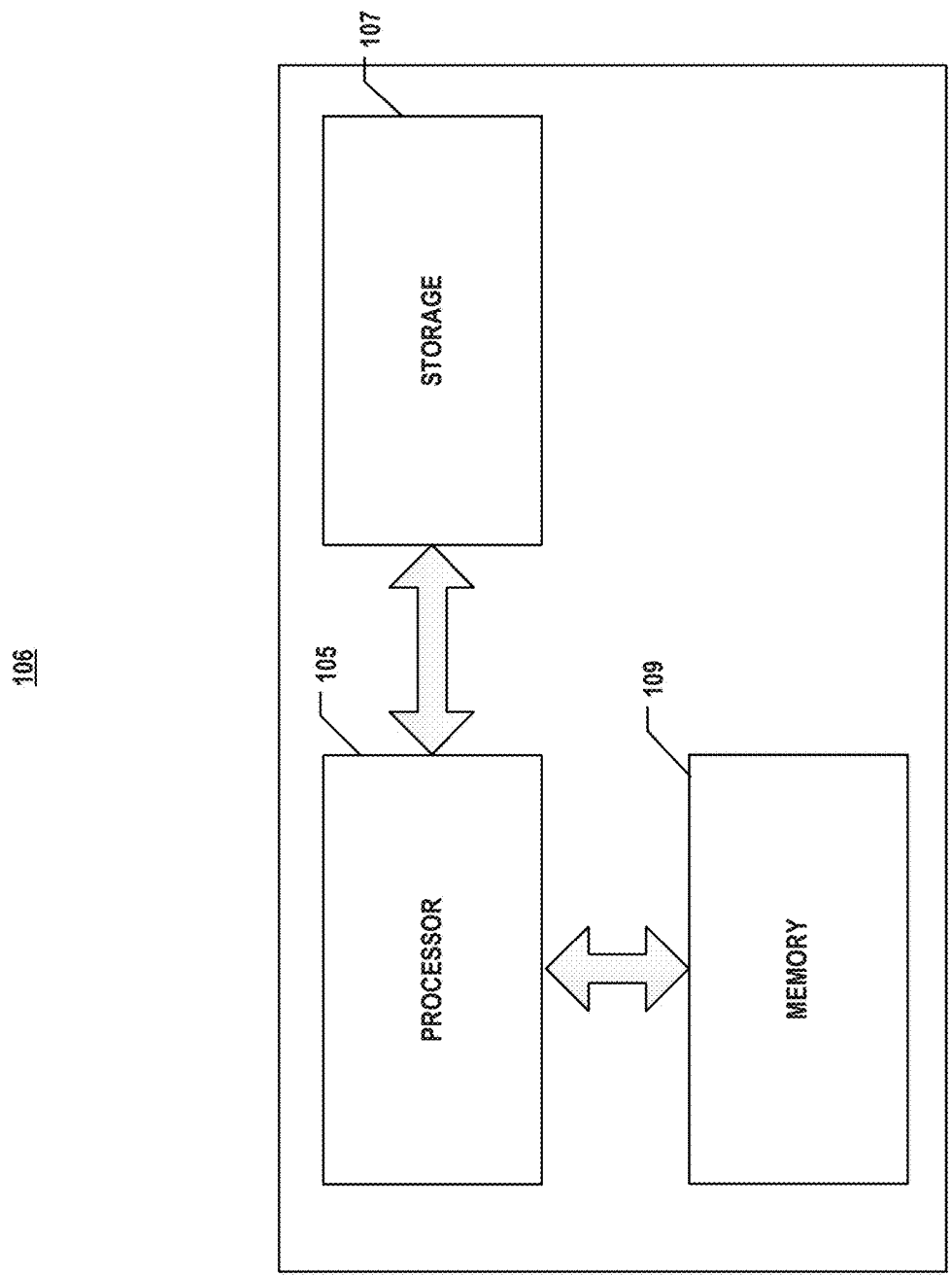
FIG. 1B illustrates a schematic diagram of the Flash memory controller, according to some aspects of the present disclosure.

FIG. 1B illustrates an exemplary implementation of Flash memory controller 106, according to some implementations. Flash memory controller 106 may control the operations of memory array device 108 by generating control signals to control the striping, computing, and storage of memory data in memory array device 108. Consistent with the present disclosure, Flash memory controller 106 may receive signals from host 104 for the operation of memory array device 108. In some implementations, Flash memory controller 106 may include a processor 105, a memory 109, and a storage 107. In some implementations, Flash memory controller 106 may have different modules in a single device, such as an integrated circuit (IC) chip (implemented as, for example, an application-specific integrated circuit (ASIC) or a field-programmable gate array (FPGA)), or separate devices with dedicated functions. In some implementations, components of Flash memory controller 106 may be in an integrated device, or distributed at different positions but communicate with each other through a network.

Processor 105 may include any appropriate type of general-purpose or special-purpose microprocessor, digital signal processor, or microcontroller. Processor 105 may be configured as a stand-alone processor module dedicated to analyzing signals (e.g., signals from host 104) and/or controlling the scan schemes. Alternatively, processor 105 may be configured as a shared processor module for performing other functions unrelated to signal analysis/scan scheme control. Although not shown in FIG. 1B, processor 105 may include multiple functional units or modules that can be implemented using software, hardware, middleware, firmware, or any combination thereof. The multiple functional units may perform read, write, erase, striping, computing, decision making, and controlling the storage of parity data of the present disclosure based on signals from host 104 or any pre-stored control data. In some implementations, processor 105 functions as a RAID engine in a multi-dimensional RAID operation.

Storage 107 and memory 109 may include any appropriate type of mass storage provided to store any type of information that processor 105 may need to operate. Memory 109 and/or storage 107 may be volatile or non-volatile, magnetic, semiconductor-based, tape-based, optical, removable, non-removable, or other types of storage device or tangible (i.e., non-transitory) computer-readable medium including, but not limited to, a ROM, a flash memory, a dynamic RAM, a static RAM, a hard disk, an SSD, an optical disk, etc. Storage 107 and/or memory 109 may be configured to store one or more computer programs that may be executed by processor 105 to perform functions disclosed herein. For example, memory 109 and/or storage 107 may be configured to store program(s) that may be executed by processor 105 to form RAID stripes, compute parity data, and control the storage of parity data. In some implementations, storage 107 and memory 109 may also be configured to store/cache information and data received and/or used by processor 105. For instance, storage 107 and memory 109 may store/cache data received from host 104, and/or data (e.g., temporary parity data) generated during the RAID operation.

Referring back to FIG. 1A, Flash memory controller 106 can include a host interface (I/F) operatively coupled to host 104, for example, through a processor bus, and configured to receive the instruction from host 104. The host I/F can include a serial attached SCSI (SAS), parallel SCSI, PCI express (PCIe), NVM express (NVMe), advanced host controller interface (AHCI), to name a few. Flash memory controller 106 can also include a management module and a NAND memory interface (I/F). In some implementations, the management module is operatively coupled to the host I/F and the NAND memory I/F and configured to generate one or more control signals to control operations (e.g., read, write, erase, and program operations) of memory array device 108 based on the instruction received from host 104 and send the control signals to the NAND memory I/F. For example, the management module determines stripes in memory array device 108, and performs computation to determine parity data and recover memory data in stripes. The management module can be any suitable control and state machine. In some implementations, the NAND memory I/F is configured to transmit the control signals to memory array device 108 and receive the status signals from memory array device 108. The status signal can indicate the status of each operation performed by memory array device 108 (e.g., failure, success, delay, etc.), which can be sent back to the management module as feedbacks. The NAND memory I/F can include single data rate (SDR) NAND Flash interface, open NAND Flash interface (ONFI), Toggle double data rate (DDR) interface, to name a few.

Memory array device 108 be a NAND Flash memory having an array of NAND memory cells in the form of an array of 3D NAND memory cells. In some implementations, the array of NAND memory cells is an array of 3D NAND memory cells, formed by the intersections of word lines and memory strings, each of which extends vertically above a substrate through a memory stack. Depending on the 3D NAND technology (e.g., the number of layers/tiers in the memory stack), a memory string typically includes 32 to 256 NAND memory cells, each of which includes a floating-gate transistor or a charge-trapping transistor.

NAND memory cells can be organized into pages, which are then organized into memory blocks, in which each NAND memory cell is electrically connected to a separate line called a bit line (BL). Each memory block is divided into a pair of strings. All cells with the same elevation in the NAND memory cell can be electrically connected through the control gates by a word line (WL), i.e., a conductive gate layer. Each word line may be electrically coupled with the control gates of memory cells in a plurality of pages. At each level, memory cells in one string is stored with page data, e.g., a lower page (LP) data portion, a middle page (MP) data portion, and an upper page (UP) data portion. In some implementations, a plane contains a plurality of memory blocks/strings that are electrically connected through the same bit line. In some implementations, a plurality of gate conductive layers are arranged in a memory block in the vertical direction. Each of the gate conductive layers extend laterally. Memory cells formed by a single gate conductive layer, and memory strings form a page. Each gate conductive layer, in one memory block, can be coupled to memory cells of multiple pages. That is, one memory block can include multiple pages on a single level. In some implementations, memory array device 108 includes multiple dies, each having at least one plane.

Host 104 may coordinate operations in different modules/parts in apparatus 100 based on data and/or signals transmitted from Flash memory controller 106. Host 104 may control the operation of RAM 110 based on data and/or signals transmitted from Flash memory controller 106. For example, host 104 may generate, cache, and transmit parity data to Flash memory controller 106, and receive, cache parity data for computation and/or reference. In some implementations, RAM 110 is part of host 104 and can be controlled by host 104 directly for storing data, e.g., memory data and/or parity data.

Figure 1C:
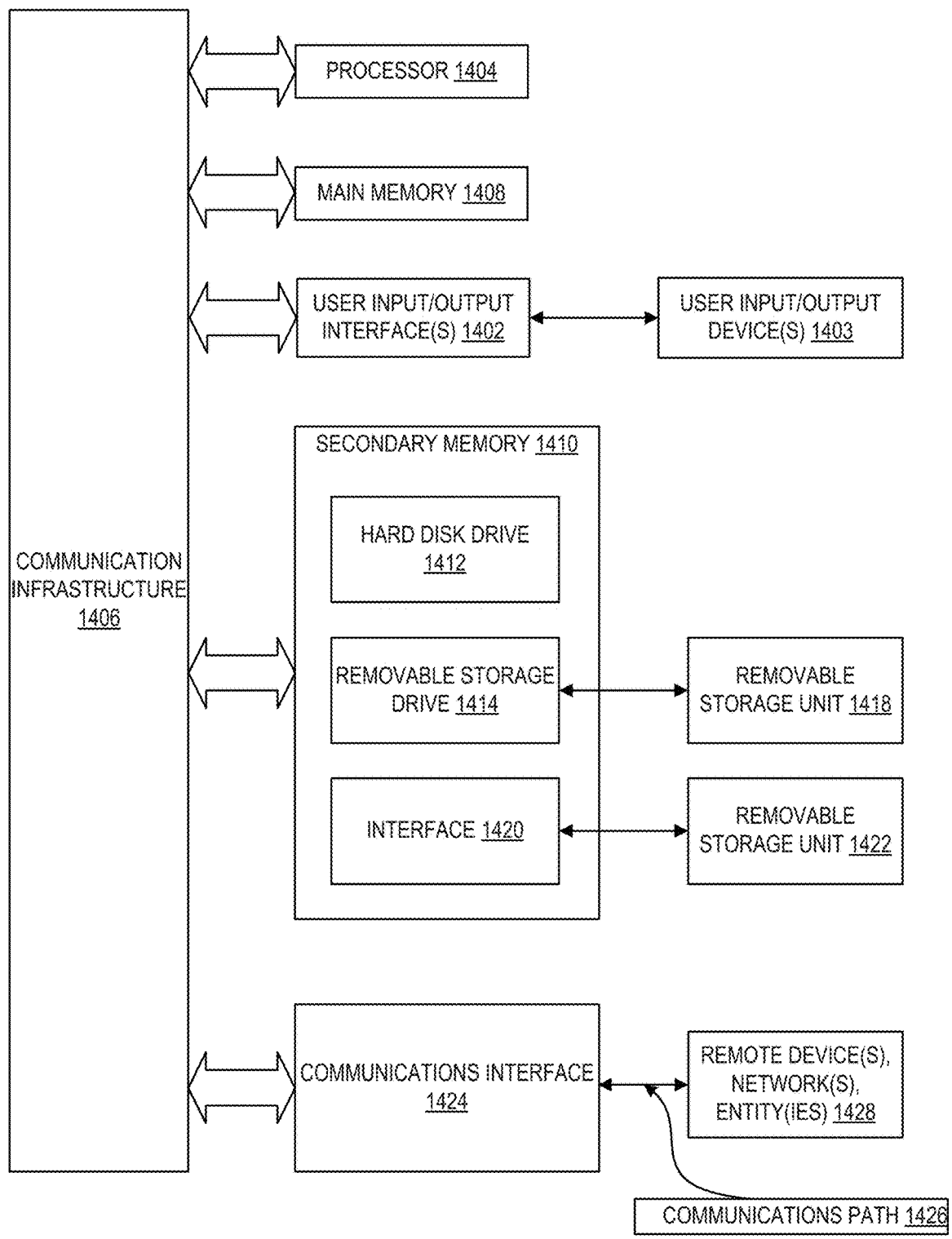
FIG. 1C illustrates a schematic diagram of the host, according to some aspects of the present disclosure.

FIG. 1C illustrates an exemplary structure of host 104, according to some aspects of the present disclosure. Host 104 can include one or more processors (also called central processing units, or CPUs), such as a processor 1404. Processor 1404 is connected to a communication infrastructure or bus 1406, according to some implementations. One or more processors 1404 can each be a graphics processing unit (GPU). In some implementations, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. In some implementations, processor 1404 functions as another RAID engine in a multi-dimensional RAID operation.

Host 104 can also include user input/output device(s) 1403, such as monitors, keyboards, pointing devices, etc., which communicate with communication infrastructure or bus 1406 through user input/output interface(s) 1402. Host 104 can also include a main or primary memory 1408, such as random-access memory (RAM). Main memory 1408 can include one or more levels of cache. Main memory 1408 has stored therein control logic (i.e., computer software) and/or data, according to some implementations.

Host 104 can also include one or more secondary storage devices or memory 1410. Secondary memory 1410 can include, for example, a hard disk drive 1412 and/or a removable storage device or drive 1414. Removable storage drive 1414 can be a floppy disk drive, a magnetic tape drive, a compact disk drive, an optical storage device, tape backup device, and/or any other storage device/drive. Removable storage drive 1414 can interact with a removable storage unit 1418. Removable storage unit 1418 includes a computer usable or readable storage device having stored thereon computer software (control logic) and/or data, according to some implementations. Removable storage unit 1418 can be a floppy disk, magnetic tape, compact disk, DVD, optical storage disk, and/any other computer data storage device. Removable storage drive 1414 can read from and/or writes to removable storage unit 1418 in a well-known manner.

According to some implementations, secondary memory 1410 can include other means, instrumentalities or other approaches for allowing computer programs and/or other instructions and/or data to be accessed by host 104. Such means, instrumentalities or other approaches may include, for example, a removable storage unit 1422 and an interface 1420. Examples of removable storage unit 1422 and interface 1420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. In some implementations, main memory 1408 and/or secondary memory 1410 are employed to store memory data and/or parity data during the multi-dimensional RAID encode/decode operations.

Host 104 can further include a communication or network interface 1424. Communication interface 1424 enables host 104 to communicate and interact with any combination of remote devices, remote networks, remote entities, etc. (individually and collectively referenced by reference number 1428), according to some implementations. For example, communication interface 1424 may allow host 104 to communicate with remote devices 1428 over communications path 1426, which may be wired and/or wireless, and which may include any combination of local area networks (LANs), wide area networks (WANs), the Internet, etc. Control logic and/or data may be transmitted to and from host 104 via communication path 1426.

In some implementations, a tangible apparatus or article of manufacture comprising a tangible computer useable or readable medium having control logic (software) stored thereon is also referred to herein as a computer program product or program storage device. This includes, but is not limited to, host 104, main memory 1408, secondary memory 1410, and removable storage units 1418 and 1422, as well as tangible articles of manufacture embodying any combination of the foregoing. Such control logic, when executed by one or more data processing devices (such as host 104), causes such data processing devices to operate as described herein.

In another example (not shown), the chips of Flash memory controller 106 and memory array device 108 may be included in the same package, such as a universal Flash storage (UFS) package or an eMMC package, and electrically connected through wire bonding. Flash memory controller 106 then may transfer data with host 104 through an interlink, such as a processor bus, which is driven by a software driver, such as a UFS driver software or an MMC driver software.

In some implementations, apparatus 100 also includes a peripheral circuit (not shown, also known as the control and sensing circuits) that includes any suitable digital, analog, and/or mixed-signal circuits used for facilitating the operations of memory array device 108. For example, the peripheral circuit can include one or more of a page buffer, a decoder (e.g., a row decoder and a column decoder), a sense amplifier, a driver (e.g., a word line driver), a charge pump, a current or voltage reference, or any active or passive components of the circuit (e.g., transistors, diodes, resistors, or capacitors).

Figure 2:
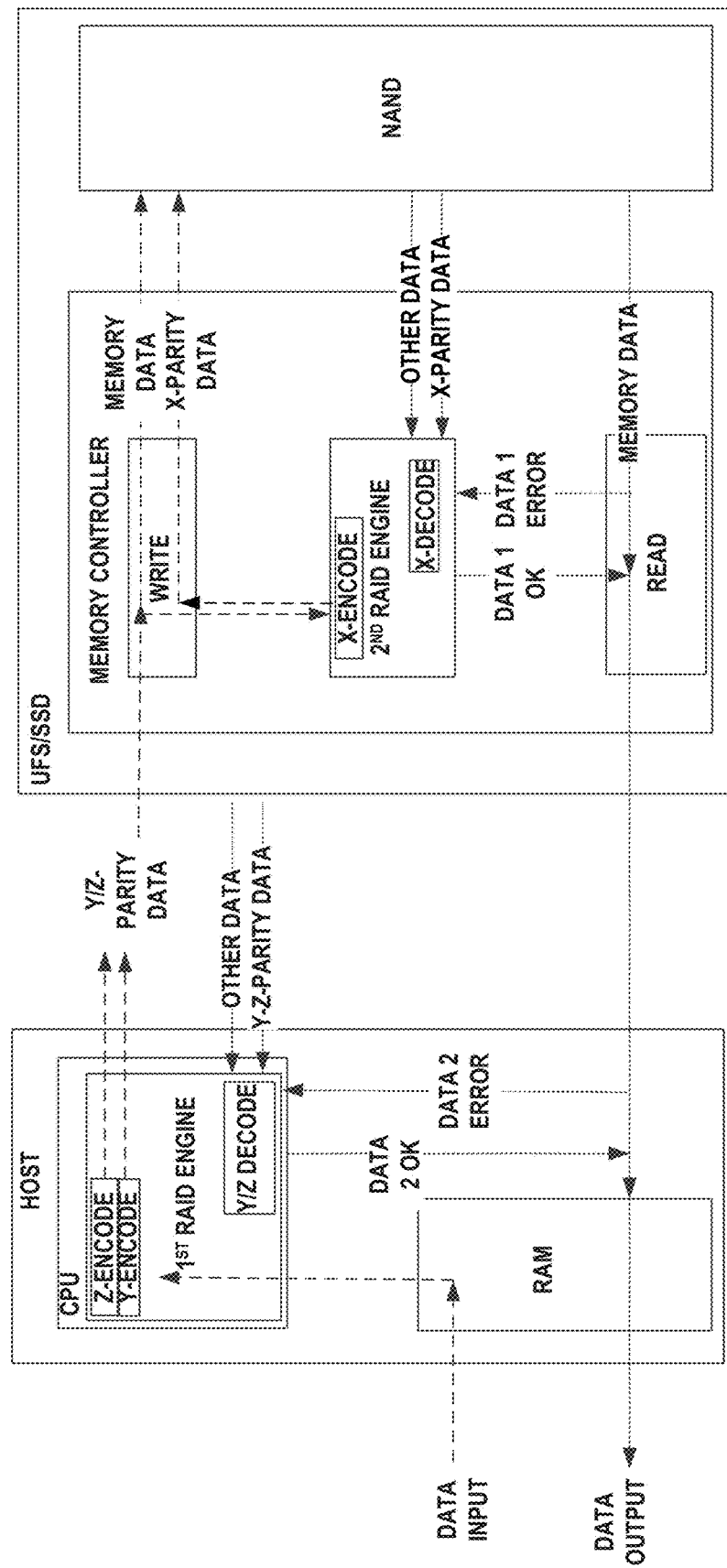
FIG. 2 is a schematic diagram of a system performing a multi-dimensional RAID operation, according to some aspects of the present disclosure.

FIG. 2 illustrates a system 200 having a host ("HOST") and a UFS/SSD, according to some aspects of the present disclosure. In the UFS/SSD, the Flash memory controller ("MEMORY CONTROLLER") and the memory array device ("NAND") are in the same chip. System 200 may be an example of apparatus 100, and is configured to perform a multi-dimensional RAID operation. In some implementations, the host is an example of host 104, the Flash memory controller is an example of Flash memory controller 106, and the memory array device is an example of memory array device 108, referring back to FIG. 1A. For case of illustration, FIG. 2 also includes certain data flow during a multi-dimensional RAID operation. For case of illustration, the data flow employed in one or more encoding operations are depicted in dashed lines, and the data flow employed in one or more decoding operations are depicted in dotted lines. In some implementations, the multi-dimensional RAID operation includes RAID 5 on each of the three dimensions (the X-dimension, the Y-dimension, and the Z-dimension) of the memory data.

As shown in FIG. 2, in a write operation, memory data ("DATA INPUT") may be received by system 200, and may be cached/stored in the memory, e.g., main memory and/or secondary memory, ("RAM") of the host for processing. The memory data may include any data to be stored in the NAND, such as user data. The memory data may undergo a multi-dimensional RAID encode operation, forming parity data, before being stored in the NAND. Part or the entirety of the processor ("CPU") of the host may function as a first RAID engine ("1$^{st}$ RAID ENGINE") that performs part of the multi-dimensional RAID encode operation. In various implementations, the host performs the computation of at least one dimension of the multi-dimensional RAID operation. As shown in FIG. 2, the host may perform Y-dimensional and Z-dimensional RAID operations, and the Flash memory controller may perform X-dimensional RAID operation. In some other implementations (not shown), the host may perform one of Y-dimensional operation or Z-dimensional RAID operation, and the Flash memory controller may perform the other two dimensional RAID operations. In some further implementations (not shown), the host may perform the entire multi-dimensional RAID operation, and the Flash memory controller does not perform any RAID operation.

TABLE I

| | DIE0 | | | | | | | | | | | | | | | | | | | | |
|---|---|---|---|---|---|---|---|---|---|---|---|---|---|---|---|---|---|---|---|---|---|
| | PL0 | | | | | | | | | | | | | | | | | | PL1 | | |
| | STR0 | | | STR1 | | | STR2 | | | STR3 | | | STR4 | | | STR5 | | | STR0 | | |
| WL# | LP | MP | UP | LP | MP | UP | LP | MP | UP | LP | MP | UP | LP | MP | UP | LP | MP | UP | LP | MP | UP |
| 0 | 0 | 1 | 2 | 3 | 4 | 5 | 6 | 7 | 8 | 9 | 10 | 11 | 12 | 13 | 14 | 15 | 16 | 17 | 0 | 1 | 2 |
| 1 | 18 | 19 | 20 | 21 | 22 | 23 | 24 | 25 | 26 | 27 | 28 | 29 | 30 | 31 | 32 | 33 | 34 | 35 | 18 | 19 | 20 |
| 2 | 36 | 37 | 38 | 39 | 40 | 41 | 42 | 43 | 44 | 45 | 46 | 47 | 48 | 49 | 50 | 51 | 52 | 53 | 36 | 37 | 38 |
| 3 | 54 | 55 | 56 | 57 | 58 | 59 | 60 | 61 | 62 | 63 | 64 | 65 | 66 | 67 | 68 | 69 | 70 | 71 | 54 | 55 | 56 |

TABLE I-continued

| | | DIE0 | | | | | | | | | | | | | |
|---|---|---|---|---|---|---|---|---|---|---|---|---|---|---|---|
| | | | | | | PL1 | | | | | | | | | |
| | STR1 | | | STR2 | | | STR3 | | | STR4 | | | STR5 | | |
| WL# | LP | MP | UP | LP | MP | UP | LP | MP | UP | LP | MP | UP | LP | MP | UP |
| 0 | 3 | 4 | 5 | 6 | 7 | 8 | 9 | 10 | 11 | 12 | 13 | 14 | 15 | 16 | 17 |
| 1 | 21 | 22 | 23 | 24 | 25 | 26 | 27 | 28 | 29 | 30 | 31 | 32 | 33 | 34 | 35 |
| 2 | 39 | 40 | 41 | 42 | 43 | 44 | 45 | 46 | 47 | 48 | 49 | 50 | 51 | 52 | 53 |
| 3 | 57 | 58 | 59 | 60 | 61 | 62 | 63 | 64 | 65 | 66 | 67 | 68 | 69 | 70 | 71 |

As an example, TABLE I illustrates part or the entirety of the memory data to be stored in the memory array device. The memory data may undergo the multi-dimensional RAID encode operation before being stored in the memory array device. In this example, it is assumed the memory data is to be stored in a die ("DIE0") having two planes ("PL0" and "PL1") arranged laterally. Each plane includes six strings ("STR0," "STR1," "STR2," "STR3," "STR4," "STR5"), and each string includes memory cells for storing upper page ("UP") data portion, middle page ("MP") data portion, and lower page ("LP") data portion. The memory cells are coupled to a plurality of word lines ("WL") arranged vertically. For ease of description, the word lines are labeled with word line numbers ("WL #"), and each word line with a different word line number is located at a respective elevation vertically. The data portions (e.g., the UP data portions, the MP data portions, and the LP data portions) are numbered for ease of illustration. Data portions stored in memory cells coupled to the same word line for the same page in different planes have the same data number. For example, as shown in TABLE I, the LP data portion stored in memory cells in the $0^{th}$ string ("STR0") and coupled to the $0^{th}$ word line ("WL0") have the data number of "0;" the MP data portion stored in memory cells in the $0^{th}$ string ("STR0") and coupled to the 0th word line ("WL0") have the data number of "1;" the UP data portion stored in memory cells in the $0^{th}$ string ("STR0") and coupled to the $0^{th}$ word line ("WL0") have the data number of "2;" and so on. In various implementations, the memory array device may have more than one die (e.g., four dies), and each die may have more than one plane (e.g., four planes). The number of word lines arranged vertically may vary from 32, 64, 96, 128, to 256. It should be noted that the disclosed multi-dimensional RAID operation can be applied on any suitable memory array device and should not be limited by the exact numbers of dies, planes, strings, and word lines of the memory array device. In some implementations, in each plane (e.g., "PL0" or "PL1"), the word line of each level (e.g., "WL0," "WL1," or "WL2") is coupled to 18 data portions (e.g., 0-17, 18-19, 36-53, or 54-71).

The first RAID engine may divide the memory data into a plurality of data parts. In some implementations, the first RAID engine divides the memory data into K data parts, K being the number of data portions corresponding to a parity data portion (i.e., the number of data portions in stripe along the Z-dimension) in the Z-dimensional RAID operation. In other words, K is equal to the number of data portions protected by one parity data portion in the Z-dimensional RAID operation. In some implementations, K is equal to 127. In various implementations, K can be equal to other suitable integers. TABLE II shows the data portions in the first data part, and TABLE III shows the data portions in the $K^{th}$ (or $127^{th}$) data part. For simplicity of illustration, the second to the $126^{th}$ data parts are now shown. For ease of illustration, data portions are shown to be arranged in two dimensions.

TABLE II

| D0-0-0 | D1-0-0 | D2-0-0 | D3-0-0 | D4-0-0 | . . . | D126-0-0 |
|---|---|---|---|---|---|---|
| D0-1-0 | D1-1-0 | D2-1-0 | D3-1-0 | D4-1-0 | . . . | D126-1-0 |
| D0-2-0 | D1-2-0 | D2-2-0 | D3-2-0 | D4-2-0 | . . . | D126-2-0 |
| D0-3-0 | D1-3-0 | D2-3-0 | D3-3-0 | D4-3-0 | . . . | D126-3-0 |
| D0-4-0 | D1-4-0 | D2-4-0 | D3-4-0 | D4-4-0 | . . . | D126-4-0 |
| . . . | . . . | . . . | . . . | . . . | | . . . . . . |
| D0-35-0 | D1-35-0 | D2-35-0 | D3-35-0 | D4-35-0 | . . . | D126-35-0 |

TABLE III

| D0-0-126 | D1-0-126 | D2-0-126 | D3-0-126 | D4-0-126 | . . . | D126-0-126 |
|---|---|---|---|---|---|---|
| D0-1-126 | D1-1-126 | D2-1-126 | D3-1-126 | D4-1-126 | . . . | D126-1-126 |
| D0-2-126 | D1-2-126 | D2-2-126 | D3-2-126 | D4-2-126 | . . . | D126-2-126 |
| D0-3-126 | D1-3-126 | D2-3-126 | D3-3-126 | D4-3-126 | . . . | D126-3-126 |
| D0-4-126 | D1-4-126 | D2-4-126 | D3-4-126 | D4-4-126 | . . . | D126-4-126 |
| . . . | | . . . | . . . | . . . | . . . | . . . |
| D0-35-126 | D1-35-126 | D2-35-126 | D3-35-126 | D4-35-126 | . . . | D126-35-126 |

Each of the K data parts may be shown as a two-dimensional array of data portions. Each of the K arrays may have I rows and J columns, I being equal to the total number of data portions corresponding to (e.g., to be stored in) the memory cells coupled to two adjacent word lines. As shown in TABLE I, TABLE II, and TABLE III, in an example, I is equal to 36. In some implementations, J is equal to the total number of data portions in the memory data divided by K and further divided by I. In an example, J may be equal to 127.

The data portions arranged in each row along the X-dimension in a two-dimensional array, e.g., as shown in TABLE II and TABLE III, may be equal to the data portions to be stored in (e.g., corresponding to) the memory cells of the same positions of respective dies but in different planes in the array memory device. In other words, the data portions arranged in a row in each array includes the data portions to be stored in (e.g., corresponding to) the memory cells coupled to every other (odd or even) word line, in the page of the same string, and in all planes. For example, data portion 0 in plane "PL0" is equal to (e.g., shown as or corresponding to) D0-0-0, data portion 0 in plane "PL1" is equal to D1-0-0, data portion 36 in plane "PL0" is equal to D2-0-0, data portion 36 in plane "PL1" is equal to D3-0-0, and so on; data portion 1 in plane "PL0" is equal to (or shown as) D0-1-0, data portion 1 in plane "PL1" is equal to D1-1-0, data portion 37 in plane "PL0" is equal to D2-1-0, data portion 37 in plane "PL1" is equal to D3-1-0, and so on; and data portion 2 in plane "PL0" is equal to (or shown as) D0-2-0, data portion 2 in plane "PL1" is equal to D1-2-0, data portion 38 in plane "PL0" is equal to D2-2-0, data portion 38 in plane "PL1" is equal to D3-2-0, and so on.

As shown in TABLE II and TABLE III, the I data portions in each column may be stored in (or corresponding to) the memory cells coupled to two adjacent (e.g., odd and even) word lines. For example, data portions (e.g., D0-0-0, D0-1-0, D0-2-0, D0-3-0, . . . , D0-35-0) in column 1 may respectively correspond to the data portions 0-35 in plane "PL0"; data portions (e.g., D1-0-0, D1-1-0, D1-2-0, D1-3-0, . . . , D1-35-0) in column 2 may respectively correspond to the data portions 0-35 in plane "PL1"; data portions (e.g., D2-0-0, D2-1-0, D2-2-0, D2-3-0, . . . , D2-35-0) in column 3 may respectively correspond to the data portions 36-71 in plane "PL0"; data portions (e.g., D3-0-0, D3-1-0, D3-2-0, D3-3-0, . . . , D3-35-0) in column 4 may respectively correspond to the data portions 36-71 in plane "PL1"; and so on.

Figure 3:
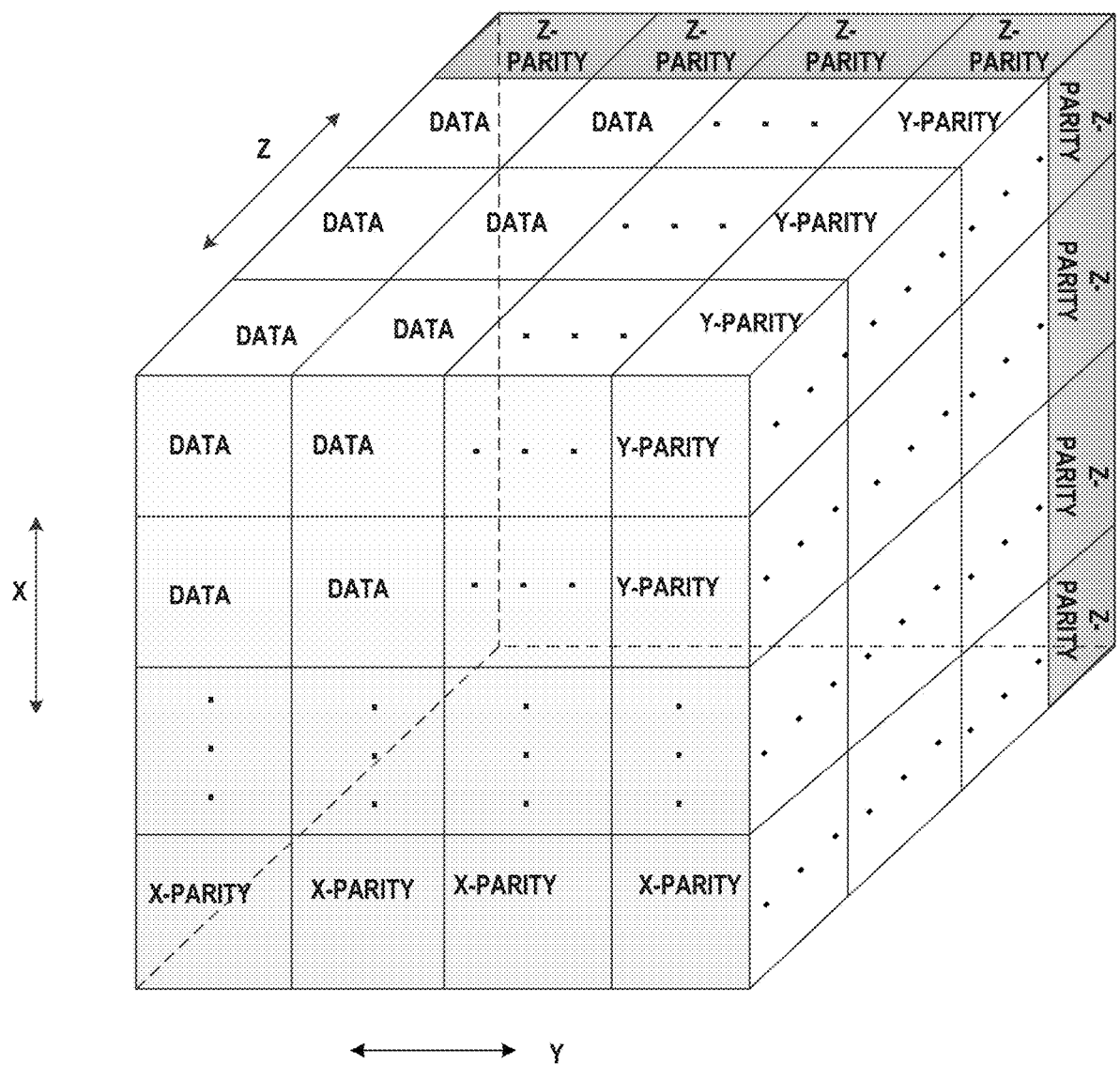
FIG. 3 illustrates memory data and parity data arrangement in a three-dimensional view, according to some aspects of the present disclosure.

FIG. 3 illustrates the arrangement of data portions and parity data in a three-dimensional space for RAID computation, according to some aspects of the present disclosure. As shown in FIG. 3, the X-, Y-, and Z-dimensions are orthogonal to one another. For each of the K arrays, the X-dimension may be equivalent to the row direction, the Y-dimension may be equivalent to the column direction, and the Z-dimension may be equivalent to the direction orthogonal to the X-Y plane. The K arrays, each in an X-Y plane, may be arranged along the Z-dimension. Each data portion in the K arrays may be shown as "DATA" in FIG. 3. In the Y-dimensional RAID operation, data portions along the Y-dimension/column direction in each array may form a stripe, and a respective parity data portion may be generated for each stripe; in the Z-dimensional RAID operation, data portions along the Z-dimension (e.g., having the same row number and same column number) in all arrays may form a stripe, and a respective parity data portion may be generated for each stripe; and in the X-dimensional RAID operation, data portions along the X-dimension/row direction in each array may form a stripe, and a respective parity data portion may be generated for each stripe. The X-dimensional parity data portions may collectively be referred to as the X-dimensional parity data ("X-PARITY"), the Y-dimensional parity data portions may collectively be referred to as the Y-dimensional parity data ("Y-PARITY"), and the Z-dimensional parity data portions may collectively be referred to as the Z-dimensional parity data ("Z-PARITY"). It should be noted that the arrangement of the data portions is merely meant to show the stripping of memory data for the multi-dimensional RAID operation and is not to indicate the way the memory data is stored/cached in the host. Data portions shown in the following figures have the format of Dx-y-z to show the stripes in the X-, Y-, and the Z-dimensions.

Referring back to FIG. 2, the first RAID engine may include a Z-dimensional encode unit ("Z-ENCODE") and/or a Y-dimensional encode unit ("Y-ENCODE") for respectively performing Z-dimensional RAID encode operation and/or Y-dimensional RAID encode operation. In some implementations, the first RAID engine may include both the Z-dimensional encode unit and the Y-dimensional encode unit. In some implementations, the Y-dimensional encode unit may form J×K stripes along the Y-dimension in the K data parts (e.g., the memory data), each column (e.g., 36 data portions) in each of the K arrays may be a stripe, e.g., along the Y-dimension. The Y-dimensional encode unit may generate a parity data portion for each stripe. In some implementations, the generation of a parity data portion may include performing an XOR operation on all the data portions in the respective stripe. In some implementations, K sets of parity data portions are generated, and each set includes J parity data portions each corresponding to a respective stripe in the respective array. FIG. 7A and FIG. 7B, respectively, illustrate the parity data portions (shown in solid circles) generated in the first array and the $K^{th}$ array.

As shown in FIG. 7A and FIG. 7B, data portions (D0-0-0, D0-1-0, . . . D0-35-0) in column 1 of the first array may form a stripe, and the corresponding parity data portion may be P0-36-0; data portions (D1-0-0, D1-1-0, . . . D1-35-0) in column 2 of the first array may form a stripe, and the corresponding parity data portion may be P1-36-0; data portions (D0-0-126, D0-1-126, . . . D0-35-126) in column 1 of the $K^{th}$ array may form a stripe, and the corresponding parity data portion may be P0-36-126; data portions (D1-0-126, D1-1-126, . . . D1-35-126) in column 2 of the $K^{th}$ array may form a stripe, and the corresponding parity data portion may be P1-36-126; and so on. The J×K stripes may be referred to as the Y-dimensional stripes, and the J×K parity data portions may be referred to as the Y-dimensional parity data.

In some implementations, the Z-dimensional encode unit may form I×J stripes along the Z-dimension in the K data parts, data portions at the same position of each of the K arrays may form a stripe, e.g., along the Z-dimension. That is, data portions having the same row number and the column number in all K arrays may form a stripe. In some implementations, each stripe includes K data portions. The Z-dimensional encode unit may determine a parity data portion for each stripe. In some implementations, the generation of a parity data portion may include performing an XOR operation on all the data portions in the respective stripe. In some implementations, I×J parity data portions are generated. FIG. 7C and FIG. 7D respectively illustrate a stripe and the parity data portion (shown in solid circles) generated for the stripe. The stripes are respectively formed of data portions at (row 1, column 1) and (row 1, column 2). The I×J stripes may be referred to as the Z-dimensional stripes, and the I×J parity data portions may be referred to as the Z-dimensional parity data.

As shown in FIG. 7C and FIG. 7D, data portions (D0-0-0, D0-0-1, D0-0-2 . . . D0-0-126) at (row 1, column 1) of the K arrays may form a stripe, and the corresponding parity data portion may be P0-0-127; data portions (D1-0-0, D1-0-1, D1-0-2, . . . D1-0-126) at (row 1, column 2) of the K arrays may form a stripe, and the corresponding parity data portion may be P0-0-127; and so on.

The host (e.g., the first RAID engine) may transmit the memory data and the parity data (e.g., first parity data) to the Flash memory controller. The first parity data may include at least one of the Y-dimensional parity data and the Z-dimensional parity data. In some implementations, the first parity data includes both the Y-dimensional parity data and the Z-dimensional parity data ("Y/Z PARITY DATA"). In some implementations, a write unit ("WRITE") of the Flash memory controller receives the first parity data and the memory data, and further transmits the first parity data and the memory data to a second RAID engine ("2$^{nd}$ RAID ENGINE") in the Flash memory controller for performing an X-dimensional RAID encode operation.

The second RAID engine may include an X-dimensional encode unit ("X-ENCODE") that can perform an X-dimensional encode operation on the memory data and the first parity data. FIG. 8A and FIG. 8B respectively illustrate the parity data portions (shown in solid circles) generated in the first array and the K$^{th}$ array, and FIG. 8C and FIG. 8D respectively illustrate the parity data portions (shown in solid circles) generated for the Y-dimensional parity data and the Z-dimensional parity data.

In some implementations, the X-dimensional encode unit may form I×K stripes along the X-dimension in the K data parts, data portions in the same row of each of the K arrays may form a stripe. The X-dimensional encode unit may determine a parity data portion for each stripe. In some implementations, the generation of a parity data portion may include performing an XOR operation on all the data portions in the respective stripe. In some implementations, I×K parity data portions are generated. FIG. 8A and FIG. 8B respectively illustrate the parity data portions (shown in solid circles) generated for stripes in the first array and the K$^{th}$ array. The I×K parity data portions may be part of X-dimensional parity data.

The X-dimensional encode unit may also generate parity data for the Y-dimensional parity data. As shown in FIG. 8C, the X-dimensional encode unit may generate K stripes along the X-dimension, each stripe including the parity data portions of a respective one of the K arrays, referring back to FIG. 7A. For example, parity data portions of the first array (P0-36-0, P1-36-0, P2-36-0, . . . , P126-36-0) may form a stripe; parity data portions of the second array (P0-36-1, P1-36-1, P2-36-1, . . . , P126-36-1) may form a stripe; . . . ; and parity data portions of the K$^{th}$ array (P0-36-126, P1-36-126, P2-36-126, . . . , P126-36-126) may form a stripe. The X-dimensional encode unit may generate K parity data portions, e.g., P127-36-0, P127-36-1, . . . , P127-36-126, respectively, for each of the stripes.

The X-dimensional encode unit may also generate parity data for the Z-dimensional parity data. As shown in FIG. 8D, the X-dimensional encode unit may generate I stripes along the X-dimension, each stripe including the parity data portions of stripes each containing all data portions having a respective row number of the K arrays, referring back to FIG. 7B. For example, parity data portions (P0-0-127, P1-0-127, P2-0-127, . . . , P126-0-127) may each be the parity data portion of a stripe formed by the data portions of the respective column number in the first row of all K arrays; parity data portions (P0-1-127, P1-1-127, P2-1-127, . . . , P126-1-127) may each be the parity data portion of a stripe formed by the data portions of the respective column number in the second row of all K arrays; . . . ; and parity data portions (P0-35-127, P1-35-127, P2-35-127, . . . , P126-35-127) may each be the parity data portion of a stripe formed by the data portions of the respective column number in the I$^{th}$ row of all K arrays. The X-dimensional encode unit may generate I parity data portions, e.g., P127-0-127, P127-1-127, . . . , P127-35-127, respectively for each of the stripes. The I×K stripes (shown in FIG. 8A and FIG. 8B), the K stripes (shown in FIG. 8C), and the I stripes (shown in FIG. 8D) may collectively be referred to as the X-dimensional stripes, and the respective parity data portions may collectively be referred to as the X-dimensional parity data (e.g., second parity data).

The X-dimensional encode unit of the second RAID engine may transmit the memory data and the X-dimensional parity data to the write unit of the Flash memory controller. The write unit may then write/store the memory data ("MEMORY DATA") and the X-dimensional parity data ("X-PARITY DATA") into the memory array device ("NAND").

In a read operation, after receiving a read signal from the host, a read unit ("READ") of Flash memory controller may access the memory data from the memory array device. If the memory data is read out successfully, the read unit may output the memory data to the memory of the host, and the host may further output the memory data ("DATA OUTPUT") from the memory. If the memory data is not read out successfully, the read unit may send an error signal ("DATA 1 ERROR") to the second RAID engine indicating the read failure. An X-dimensional decode unit ("X-DECODE") of the second RAID engine may access the X-dimensional parity data ("X-PARITY DATA") and other data ("OTHER DATA") such as the memory data, and attempts to recover the compromised data portion along the X-dimension using the X-dimensional parity data. If the recovering of the compromised data portion is successful, the second RAID engine may send a success ("DATA 1 OK") signal to the read unit and transmit the recovered data portion to read out. The read unit may then send the successfully recovered memory data to the host for output.

If the recovering of the compromised data fails using the X-dimensional parity data, the second RAID engine may send an error signal ("DATA 2 ERROR") to the first RAID engine (e.g., through the read unit) indicating the recovering failure. A Y-/Z-dimensional decode unit ("Y/Z DECODE") of the first RAID engine may access the Y-dimensional parity data and the Z-dimensional parity data ("Y-PARITY/Z-PARITY") and other data ("OTHER DATA") such as the memory data from the Flash memory device, e.g., through the Flash memory controller. The Y-/Z-dimensional decode unit may use the Y-dimensional parity data and/or the Z-dimensional parity data to recover the compromised data portions respectively along the Y-dimension and/or the Z-dimension. If the recovery of the compromised data is successful, the first RAID engine may send a success signal ("DATA 2 OK") to the read unit of the Flash memory controller. The memory data can then be successfully read out as the output. If the recovery of the compromised data fails, the first RAID engine may send an error signal ("DATA 2 ERROR") to the Flash memory controller indicating the read failure. In some implementations, the recovery of compromised memory data along each dimension includes a respective XOR operation. The detailed description of the read operation including the decode operations along the X-, Y-, and Z-dimensions are provided below.

Figure 4:
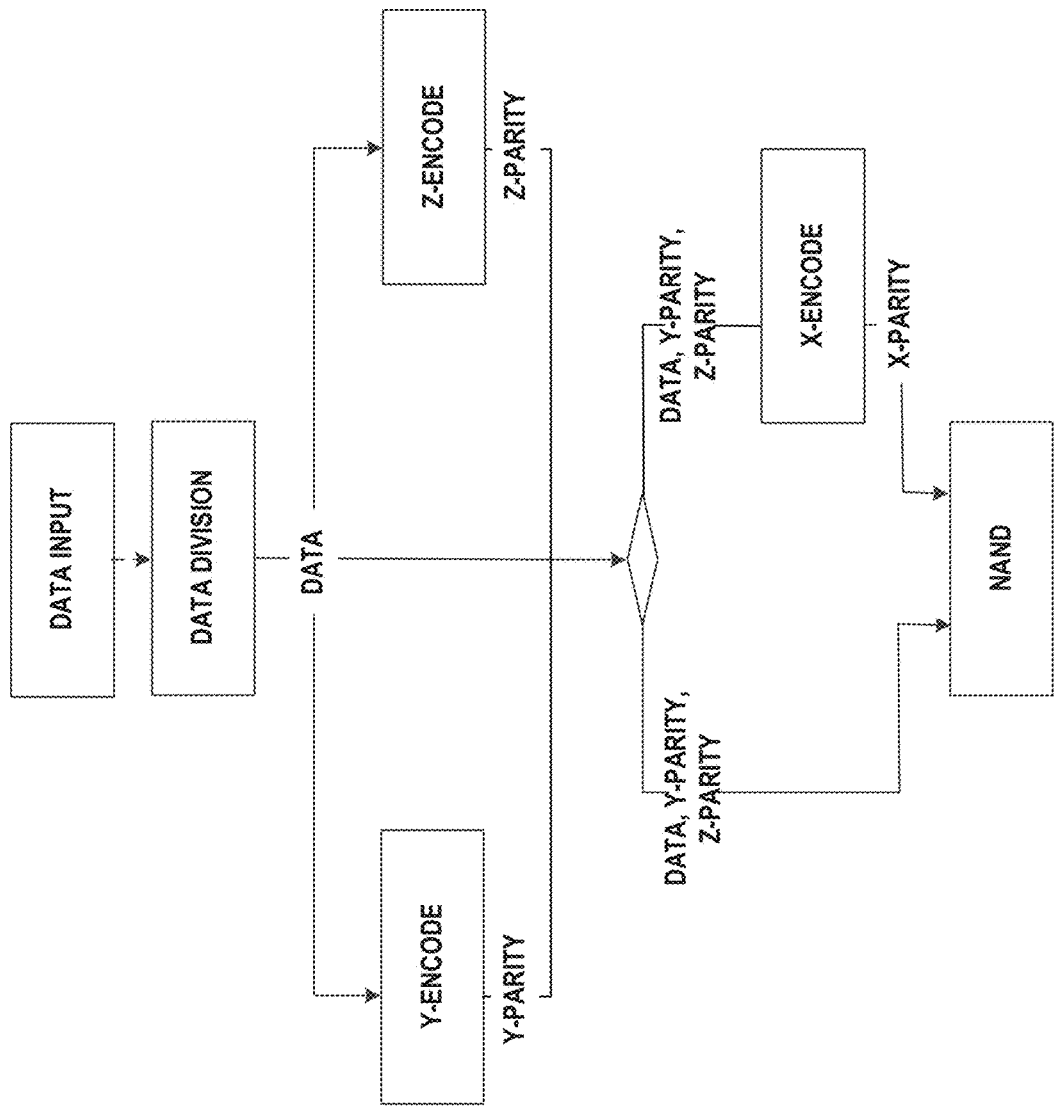
FIG. 4 illustrates a process flow of a multi-dimensional RAID encode operation, according to some aspects of the present disclosure.
Figure 5:
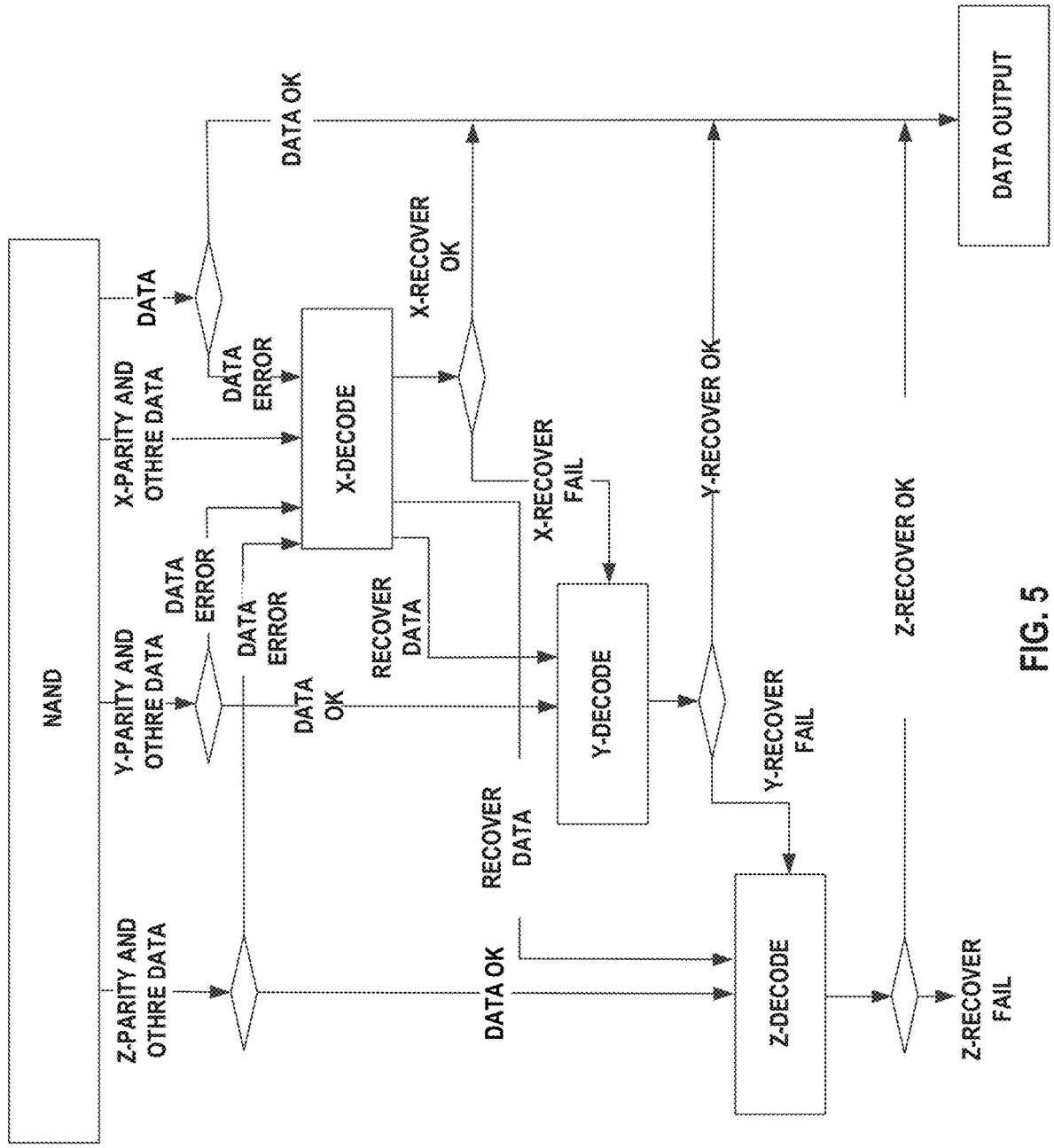
FIG. 5 illustrates a process flow of a multi-dimensional RAID decode operation, according to some aspects of the present disclosure.
Figure 6A:
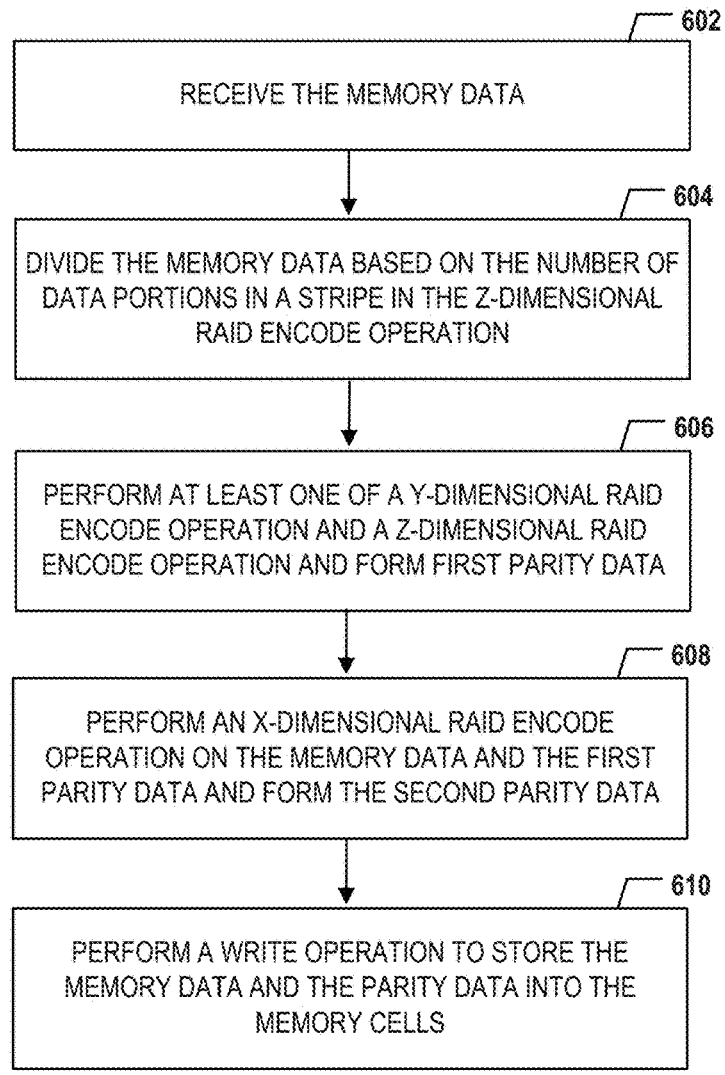
FIG. 6A illustrates a flowchart of a method for performing a multi-dimensional RAID encode operation on the memory array device in FIG. 1A, according to some aspects of the present disclosure.
Figure 6B:
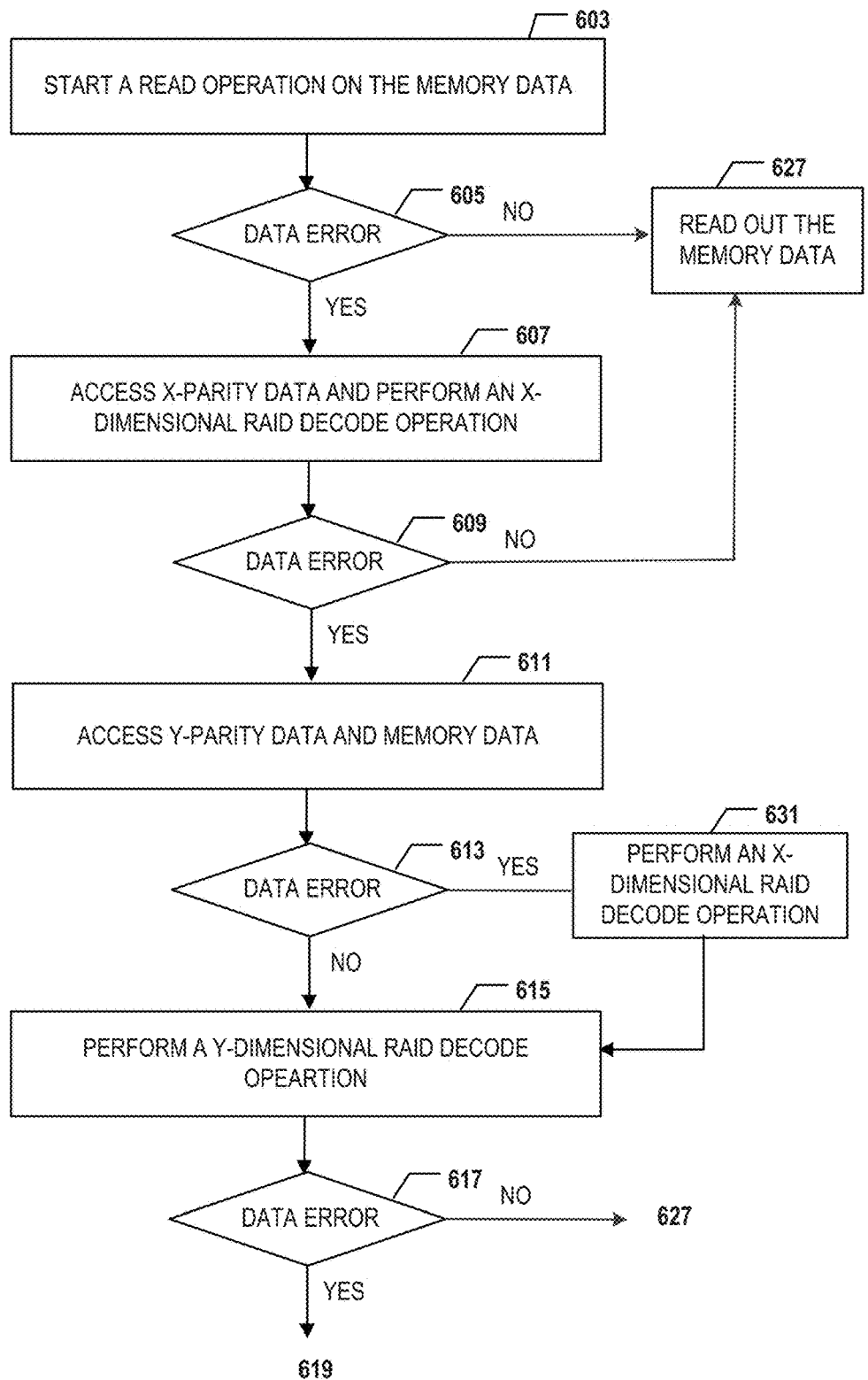
FIGS. 6B and 6C illustrate a flowchart of a method for performing a multi-dimensional RAID decode operation on the memory array device in FIG. 1A, according to some aspects of the present disclosure.
Figure 6C:
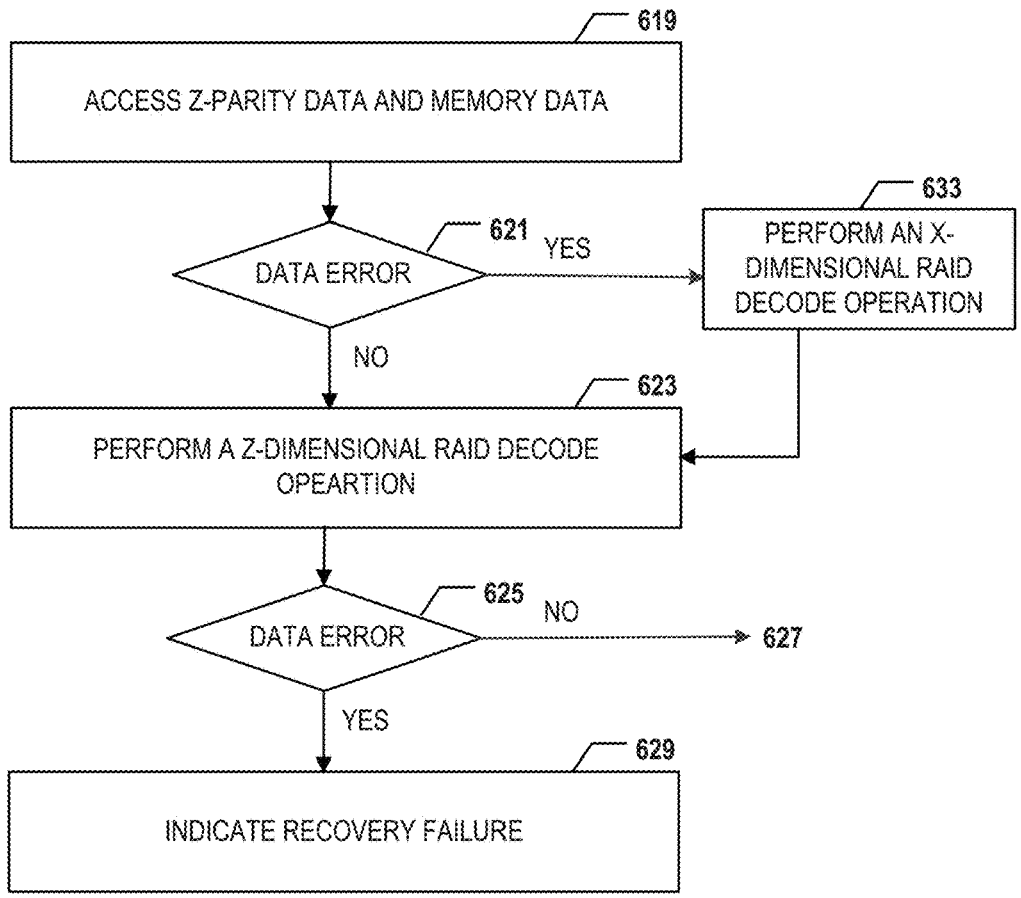

FIG. 4 illustrates encode operations along the X-, Y-, and Z-dimensions by system, according to some aspects of the present disclosure. FIG. 5 illustrates decode operations along the X-, Y-, and Z-dimensions by system 200, according to some aspects of the present disclosure. FIG. 6A illustrates a flowchart of a method 600 for encoding memory data using the multi-dimensional RAID encode operation, according to some aspects of the present disclosure. FIGS. 6B and 6C illustrate a flowchart of a method 601 for decoding memory data using the multi-dimensional RAID decode operation, according to some aspects of the present disclosure. FIG. 6C is a continuation of FIG. 6B. For case of illustration, FIGS. 2, 4, and 6A are described together, and FIGS. 2, 5, 6B, and 6C are described together. It is understood that the operations shown in methods 600 and 601 are not exhaustive and that other operations can be performed as well before, after, or between any of the illustrated operations. Further, some of the operations may be performed simultaneously, or in a different order than shown in FIGS. 6A-6C. In some implementations, the encode operation is part of a write operation of system 200, and the decode operation is part of a read operation of system 200.

Method 600 starts at operation 602, in which memory data is received. As shown in FIGS. 2 and 4, memory data, e.g., user data or fund data, may be received by system 200, e.g., a host, as input ("DATA INPUT"). After receiving the memory data, method 600 proceeds to operation 604, in which the memory data is divided based on the number of data portions in a stripe in the Z-dimensional RAID encode operation. As shown in FIG. 4, an operation of "DATA DIVISION" is performed by system 200. In some implementations, the host may divide the memory data into K data parts, K being the number of data portions in a stripe in the Z-dimensional RAID encode operation. In some implementations, each of the K data parts includes a two-dimensional array having I rows and J columns along the X-dimension and the Y-dimension, I being the number of data portions coupled to two adjacent word lines.

After the memory data is divided, method 600 proceeds to operation 606, in which at least one of a Y-dimensional RAID encode operation and a Z-dimensional RAID encode operation is performed, forming first parity data. As shown in FIG. 4, system 200 may employ the divided memory data ("DATA") for Y-dimensional RAID encode operation and/or Z-dimensional encode operation. In some implementations, a Y-dimensional encode unit ("Y-ENCODE") of the host performs striping on the K arrays to form J×K stripes along the Y-dimension, each stripe having data portions of a respective column of the K arrays. In some implementations, a Z-dimensional encode unit ("Z-ENCODE") of the host performs striping on the K arrays to form I×J stripes along the Z-dimension, each stripe having data portions of the same row number and the same column number in the K arrays. The Y-dimensional encode unit may respectively generate a parity data portion for each stripe, forming J×K Y-dimensional parity data portions ("Y-PARITY"). The Z-dimensional encode unit may respectively generate a parity data portion for each stripe, forming I×J Z-dimensional parity data portions ("Z-PARITY"). In some implementations, generating the parity data portion for each stripe (e.g., Y-/Z-dimensional stripes) comprises performing an XOR operation amongst the memory portions in the respective Y-/Z-dimensional stripe. The detailed description of the stripping and generation of parity data along the Y-dimension and the Z-dimension may be referred to the description of FIG. 2 and is not repeated herein.

In some implementations, K is equal to 126, I is equal to 36, and J is equal to 127. That is, in the Y-dimensional RAID encode operation, each Y-dimensional parity data portion protects 36 (e.g., I) data portions, e.g., the protection ratio is 36:1. In some other implementations, the number of data portions protected by each Y-dimensional parity data portion, e.g., the value of I, may change. For example, the value of I may change as the number of data portions in each word line (or two adjacent word lines) changes. For example, I may be equal to 36×N, N being a positive integer greater than or equal to 1.

The value of K may be equal to the number of data portions protected by a Z-dimensional parity data portion, e.g., the protection ratio is K:1. In various implementations, the value of K may vary based on factors such as the architecture of the memory array device and/or the stripping configuration. For example, K may be equal to 127 or 36×M, M being a positive integer greater than or equal to 1.

After performing the Y-dimensional RAID encode operation and the Z-dimensional RAID encode operation, method 600 proceeds to operation 608, in which an X-dimensional RAID encode operation is performed on the memory data and the first parity data, forming second parity data. As shown in FIG. 4, the host may transmit the memory data ("DATA") and the first parity data (e.g., the Y-dimensional parity data and the Z-dimensional parity data) to the Flash memory controller for an X-dimensional RAID encode operation. An X-dimensional encode unit of the Flash memory controller may perform an X-dimensional RAID encode operation respectively on the memory data, the Y-dimensional parity data, and the Z-dimensional parity data. In some implementations, each row, having J data portions, of the K arrays may form a stripe along the X-dimension, and I×K X-dimensional parity data portions may be formed. The X-dimensional RAID encode engine may generate a respective X-dimensional parity data portion for each stripe. In some implementations, the protection ratio is J:1, J being equal to 127.

The X-dimensional RAID encode engine may also form K stripes along the X-dimension from the Y-dimensional parity data, and form I stripes along the X-dimension from the Z-dimensional parity data. In some implementations, the X-dimensional RAID encode engine may generate a respective parity data portion for each stripe of the Y-dimensional parity data and the Z-dimensional parity data. The X-dimensional parity data ("X-PARITY") for the Y- and Z-dimensional parity data and the memory data may collectively be referred to as the second parity data.

At operation 610, a write operation is performed to store the memory data and the parity data into the memory cells. The Flash memory controller may store the second parity data into the memory array device ("NAND"). Meanwhile, the Flash memory controller may also store the memory data and the first parity data into the memory array device.

Method 601 starts at operation 603, in which the memory data is accessed. As shown in FIGS. 2 and 5, the Flash memory device starts to access the memory data ("DATA") from the memory array device ("NAND"). If no data error ("DATA ERROR") is detected at operation 605, method 601 proceeds to operation 627, in which the memory data is read out. Otherwise, method 601 proceeds to operation 607, in which an X-dimensional RAID decode operation is performed on the compromised memory data. As shown in FIG. 5, if the Flash memory controller detects no error, e.g., using the error correction codes (ECCs), the Flash memory controller determines no memory data is compromised ("DATA OK") and sends the memory data as output ("DATA OUTPUT"). If the ECCs shows at least a data error has occurred, the Flash memory controller determines memory data is compromised ("DATA ERROR") and starts accessing the X-dimensional parity data and other data (e.g., memory data). The Flash memory controller may then perform an X-dimensional RAID decode operation using the X-dimensional parity data and the other data. As shown in FIGS. 2 and 5, an X-dimensional decode unit ("X-DECODE") of the Flash memory controller may access the X-dimensional parity data and other data. The X-dimensional decode unit may attempt to recover the compromised data portion using the memory data and the respective X-dimensional parity data. In some implementations, recovering the compromised memory data in an X-dimensional stripe comprises performing an XOR operation amongst each X-dimensional parity data portion and the non-compromised memory portions in the respective X-dimensional stripe.

If no data error is detected in operation 609, which follows operation 607, method 601 proceeds to operation 627. Otherwise, method 601 proceeds to operation 611, in which the Y-dimensional parity data and the memory data is accessed. As shown in FIGS. 2 and 5, the Flash memory controller may determine whether the recovered memory data, using the X-dimensional RAID decode operation in operation 607, can be read out. If the recovered memory data fails to be read out ("X-RECOVER FAIL"), the Flash memory controller determines a data error still exists in the memory data, and method 601 proceeds to operation 611. Otherwise, method 601 determines the read operation is successful ("X-RECOVER OK") and proceeds to operation 627.

At operation 611, Y-dimensional parity data and other data is accessed. A Y-dimensional decode unit ("Y-DECODE) of the host may access the Y-dimensional parity data and other data ("Y-PARITY AND OTHER DATA"), e.g., memory data. If no data error is detected at operation 613, method 601 proceeds to operation 615, in which a Y-dimensional RAID decode operation is performed on the memory data. Otherwise, method 601 proceeds to operation 631, in which an X-dimensional RAID decode operation is performed on the Y-dimensional parity data and the respective X-dimensional RAID parity data. The host may determine whether an error has occurred in the Y-dimensional parity data. If an error is detected ("DATA ERROR"), the host may notify the X-dimensional decode unit of the Flash memory controller to recover the Y-dimensional parity data using the respective X-dimensional parity data. The recovering of the Y-dimensional parity data may include an X-dimensional RAID decode operation, which includes an XOR operation amongst an X-dimensional RAID parity portion and the non-compromised Y-dimensional RAID parity portions in the respective stripe. The recovered Y-dimensional parity data ("RECOVER DATA") may be used in the Y-dimensional RAID decode operation. If no error is detected ("DATA OK") in the Y-dimensional parity data, the host may use the Y-dimensional parity data in the Y-dimensional RAID decode operation. Operation 631 may proceed to operation 615.

At operation 615, a Y-dimensional RAID decode operation is performed on the memory data. The Y-dimensional decode unit may attempt to recover the compromised memory data using the memory data and the respective Y-dimensional parity data. In some implementations, recovering the compromised memory data comprises performing an XOR operation amongst each Y-dimensional parity data portion and the non-compromised memory portions in the respective Y-dimensional stripe.

If no data error is detected in operation 617, which follows operation 615, method 601 proceeds to operation 627. Otherwise, method 601 proceeds to operation 619, in which an in which the Z-dimensional parity data and the memory data is accessed. As shown in FIGS. 2 and 5, the Flash memory controller may determine whether the recovered memory data, using the Y-dimensional RAID decode operation in operation 615, can be read out. If the recovered memory data fails to be read out ("Y-RECOVER FAIL"), the Flash memory controller determines a data error still exists in the memory data, and method 601 proceeds to operation 619. Otherwise, method 601 determines the read operation is successful ("Y-RECOVER OK") and proceeds to operation 627.

At operation 619, Z-dimensional parity data and other data is accessed. A Z-dimensional decode unit ("Z-DECODE") of the host may access the Z-dimensional parity data and other data ("Z-PARITY AND OTHER DATA"), e.g., memory data. If no data error is detected at operation 621, method 601 proceeds to operation 623, in which a Z-dimensional RAID decode operation is performed on the memory data. Otherwise, method 601 proceeds to operation 633, in which an X-dimensional RAID decode operation is performed on the Z-dimensional parity data and the respective X-dimensional RAID parity data. The host may determine whether an error has occurred in the Z-dimensional parity data. If an error is detected ("DATA ERROR"), the host may notify the X-dimensional decode unit of the Flash memory controller to recover the Z-dimensional parity data using the respective X-dimensional parity data. The recovering of the Z-dimensional parity data may include an X-dimensional RAID decode operation, which includes an XOR operation amongst an X-dimensional RAID parity portion and the non-compromised Z-dimensional RAID parity portions in the respective stripe. The recovered Z-dimensional parity data ("RECOVER DATA") may be used in the Z-dimensional RAID decode operation. If no error is detected in the Z-dimensional parity data ("DATA OK"), the host may use the Z-dimensional parity data in the Z-dimensional RAID decode operation. Operation 633 may proceed to operation 623.

At operation 623, a Z-dimensional RAID decode operation is performed on the memory data. The Z-dimensional decode unit ("Z-DECODE") may attempt to recover the compromised memory data using the memory data and the respective Z-dimensional parity data. In some implementations, recovering the compromised memory data comprises performing an XOR operation amongst each Z-dimensional parity data portion and the non-compromised memory portions in the respective Z-dimensional stripe.

If no data error is detected in operation 625, which follows operation 623, method 601 proceeds to operation 627. Otherwise, method 601 proceeds to operation 629, in which a recovery failure is indicated. As shown in FIGS. 2 and 5, the Flash memory controller may determine whether the recovered memory data, using the Z-dimensional RAID decode operation in operation 623, can be read out. If the recovered memory data fails to be read out ("Z-RECOVER FAIL"), the Flash memory controller determines a data error still exists in the memory data, and method 601 proceeds to operation 629. Otherwise, method 601 determines the read operation is successful ("Z-RECOVER OK") and proceeds to operation 627.

FIGS. 9A, 9B, 9C, and 9D illustrate examples in which compromised memory data (in dotted circles) is recovered using the multi-dimensional RAID operation. In an example, as shown in FIG. 9A, three consecutive data portions, e.g., D0-0-0, D0-1-0, D0-2-0, coupled to a word line may be compromised. The three compromised data portions may be along the Y-dimension. Each of the compromised data portions may be recovered by performing an XOR operation on a respective X-dimensional parity data portion and the non-compromised data portions of the same stripe. For example, D0-0-0 may be recovered by performing an XOR operation on P127-0-0 and (D1-0-0, D2-0-0, . . . , D126-0-0); D0-1-0 may be recovered by performing an XOR operation on P127-1-0 and (D1-1-0, D2-1-0, . . . , D126-1-0); and D0-2-0 may be recovered by performing an XOR operation on P127-2-0 and (D1-2-0, D2-2-0, . . . , D126-2-0).

In another example, as shown in FIG. 9B, four data portions, e.g., D0-1-0, D1-1-0, D2-1-0, D3-1-0, coupled to the memory cells at the same position of different word lines may be compromised. The four compromised data portions may be along the X-dimension. Each of the compromised data portions may be recovered by performing an XOR operation on a respective Y-dimensional parity data portion and the non-compromised data portions of the same stripe. For example, D0-1-0 may be recovered by performing an XOR operation on P0-36-0 and (D0-0-0, D0-2-0, D0-3-0, . . . , D0-35-0); D1-1-0 may be recovered by performing an XOR operation on P1-36-0 and (D1-0-0, D1-2-0, D1-3-0, . . . , D1-35-0); D2-1-0 may be recovered by performing an XOR operation on P2-36-0 and (D2-0-0, D2-2-0, D2-3-0, . . . , D2-35-0), and D3-1-0 may be recovered by performing an XOR operation on D3-36-0 and (D3-0-0, D3-2-0, D3-3-0, . . . , D3-35-0).

In another example, as shown in FIG. 9C, twelve data portions, e.g., D0-0-0, D1-0-0, D2-0-0, D3-0-0, D0-1-0, D1-1-0, D2-1-0, D3-1-0, D0-2-0, D1-2-0, D2-2-0, D3-2-0, coupled to the memory cells at the same position of different word lines may be compromised. The twelve compromised data portions may be along both the X-dimension and the Y-dimension. Each of the compromised data portions may be recovered by performing an XOR operation on a respective Z-dimensional parity data portion and the non-compromised data portions of the same stripe. FIG. 9D illustrates the Z-dimensional parity data corresponding to the memory data in FIG. 9C. For example, D0-0-0 may be recovered by performing an XOR operation on P0-0-127 and (D0-0-1, D0-0-2, . . . , D0-0-126); D1-0-0 may be recovered by performing an XOR operation on P1-0-127 and (D1-0-1, D1-0-2, . . . , D1-0-126); . . . ; D0-1-0 may be recovered by performing an XOR operation on P0-1-127 and (D0-1-1, D0-1-2, . . . , D0-1-126); . . . and D3-2-0 may be recovered by performing an XOR operation on P3-2-127 and (D3-2-1, D3-2-2, . . . , D3-2-126).

It should be noted that, although not specified, the host can also be configured to perform at least one of the X-dimensional encode operation and X-dimensional decode operation. That is, in some implementations, at least one of the X-dimensional encode operation and X-dimensional decode operation can also be performed using a software means. However, the specific process to implement the X-, Y-, and Y-dimensional RAID operations by the host should not be limited by the embodiments of the present disclosure.

One aspect of the present disclosure provides a system. The system includes a memory device for storing memory data. The memory device includes an array of memory cells and a plurality of word lines arranged in a plurality of rows and coupled to the array of memory cells. The system also includes a memory controller, having a processor and a memory, operatively coupled to the array of memory cells. The system further includes a host, having another processor and another memory, operatively coupled to the memory controller. The other processor of the host is configured to perform a first RAID encode operation on memory data to form first parity data. The processor of the memory controller is configured to receive the first parity data and the memory data, and perform a second RAID encode operation on the first parity data and the memory data to form second parity data.

In some implementations, the first RAID encode operation includes at least one of a Y-dimensional RAID encode operation or a Z-dimensional RAID encode operation.

In some implementations, the second RAID encode operation includes an X-dimensional RAID encode operation.

In some implementations, the other processor of the host is further configured to divide the memory data into K data parts each comprising a plurality of data portions arranged in I rows and J columns, K being a number of data portions corresponding to each parity data portion in the Z-dimensional RAID encode operation. Data portions in each of the I rows correspond to a same position in memory cells coupled to every other word line, and data portions in each of the J columns correspond to memory cells in two adjacent word lines.

In some implementations, the other processor of the host is further configured to form K sets of first stripes, each of the K sets comprising J first stripes, each of the J first stripes corresponding to a respective one of the J columns. In some implementations, the other processor of the host is further configured to perform the Y-dimensional RAID encode operation includes, for each of J first stripes in each of the K sets, generating a respective first parity data portion.

In some implementations, the first parity data includes K×J first parity data portions; and the processor of the memory controller is further configured to arrange the K×J first parity data portions into K rows and J columns, each of the K rows comprising J first parity data portions of the respective one of the K sets. The processor of the memory controller is further configured to form K second stripes, each corresponding to a respective one of the K rows of first parity data portions.

In some implementations, performing the second RAID encode operation includes performing an X-dimensional RAID encode operation to generate a set of K second parity data portions, each of the K second parity data portions corresponding to a respective one of the K second stripes.

In some implementations, the other processor of the host is further configured to form I×J sets of third stripes, each of the I×J sets comprising K data portions each comprising data portions having a same row number and a same column number in each of the K data parts. The other processor of the host is also configured to perform the Z-dimensional RAID encode operation includes, for each of the I×J sets of third stripes, generating a respective third parity data portion.

In some implementations, the first parity data includes I×J third parity data portions. The processor of the memory controller is further configured to arrange the I×J third parity data portions into I rows and J columns, each of the I rows comprising J third parity data portions corresponding to the J columns of a respective row in the K data parts; and form I fourth stripes, each corresponding to a respective one of the I rows of third parity data portions.

In some implementations, performing the second RAID encode operation includes performing an X-dimensional RAID encode operation to generate a set of I fourth parity data portions, each of the I fourth parity data portions corresponding to a respective one of the I fourth stripes.

In some implementations, the processor of the memory controller is further configured to form K sets of fifth stripes, each of the K sets comprising I fifth stripes each corresponding to a respective one of the I rows in each of the K data parts. In some implementations, the processor of the memory controller is further configured to, for each of the K sets of fifth stripes, perform an X-dimensional RAID encode operation to generate I fifth parity data portions each corresponding to a respective one of the I fifth stripes, forming K×I fifth parity data portions.

In some implementations, the processor of the memory controller is further configured to perform a write operation to store the first parity data, the second parity data, and the memory data into the array of memory cells.

In some implementations, I is equal to a total number of the data portions stored in the memory cells coupled to the two adjacent word lines.

In some implementations, the processor of the memory controller is further configured to, in response to a failed read operation on the memory data, perform an X-dimensional RAID decode operation that includes: accessing the memory data and second parity data from the array of memory cells, determining a compromised data portion in the memory data based on memory data and respective X-dimensional parity data in the second parity data, and recovering the compromised data portion based on the memory data and the respective X-dimensional parity data. The processor of the memory controller is further configured to, in response to recovering the memory data using the X-dimensional RAID decode operation being successful, reading out the memory data; and in response to recovering the memory data using the X-dimensional RAID decode operation failed, notifying the other processor of the host to perform a Y-dimensional RAID decode operation.

In some implementations, the other processor of the host is further configured to, in response to receiving a notification from the processor of the memory controller, access the memory data and the first parity data from the array of memory cells; and determine whether Y-dimensional parity data of the memory data, in the first parity data, is compromised. If the Y-dimensional parity data is compromised, the other processor of the host is configured to notify the processor of the memory controller to recover the Y-dimensional parity data using X-dimensional parity data corresponding to the Y-dimensional parity data. If the Y-dimensional parity data is not compromised, the other processor of the host is configured to perform the Y-dimensional RAID decode operation using the Y-dimensional parity data and the memory data.

In some implementations, performing the Y-dimensional RAID decode operation includes determining the compromised data portion in the memory data based on memory data and the Y-dimensional parity data and recovering the compromised memory data based on the memory data and the Y-dimensional parity data. In response to recovering the memory data using the Y-dimensional RAID decode operation being successful, the other processor of the host is configured to read out the memory data. In response to the recovering of the memory data using the Y-dimensional RAID decode operation failed, the other processor of the host is configured to perform a Z-dimensional RAID decode operation.

In some implementations, the other processor of the host is further configured to, in response to receiving a notification from the processor of the memory controller, access the memory data and the first parity data from the array of memory cells and determine whether Z-dimensional parity data of the memory data, in the first parity data, is compromised. If the Z-dimensional parity data is compromised, the other processor of the host is further configured to notify the processor of the memory controller to recover the Z-dimensional parity data using X-dimensional parity data corresponding to the Z-dimensional parity data. If the Z-dimensional parity data is not compromised, the other processor of the host is further configured to perform the Z-dimensional RAID decode operation using the Z-dimensional parity data and the memory data.

In some implementations, performing the Z-dimensional RAID decode operation includes determining the compromised data portion in the memory data based on memory data and the Z-dimensional parity data and recovering the compromised memory data based on the memory data and the Z-dimensional parity data. In response to recovering the memory data using the Z-dimensional RAID decode operation being successful, the other processor of the host is further configured to read out the memory data. In response to the recovering of the memory data using the Z-dimensional RAID decode operation failed, the other processor of the host is further configured to end the read operation.

Another aspect of the present disclosure provides a memory controller. The memory controller includes a processor and a memory, operatively coupled to a plurality of memory cells for storing memory data; the memory cells being coupled to a plurality of word lines arranged in a plurality of rows. The processor is configured to receive memory data and first parity data of the memory data; perform a RAID encode operation on the memory data and the first parity data to form second parity data, and perform a write operation to store the memory data, the first parity data, and the second parity data into the memory cells.

In some implementations, the first parity data includes parity data of the memory data in a first dimension and the second parity data includes parity data of the memory data in a second dimension different from the first dimension.

In some implementations, the first parity data includes at least one of a Y-dimensional parity data or a Z-dimensional parity data, and the second parity data includes parity data of the memory data in an X-dimensional parity data.

In some implementations, the memory data includes K data parts each comprising a plurality of data portions arranged in I rows and J columns, K being a number of data portions corresponding to each parity data portion in the Z-dimensional parity data. Data portions in each of the I rows correspond to a same position in memory cells coupled to every other word line. Data portions in each of the J columns correspond to memory cells in two adjacent word lines.

In some implementations, the processor is further configured to, for the memory data, form K sets of stripes, each of the K sets comprising I stripes each corresponding to a respective one of the I rows in each of the K data parts. In some implementations, the processor is further configured to, for each of the K sets of stripes, perform an X-dimensional RAID encode operation to generate I parity data portions each corresponding to a respective one of the I stripes, forming K×I parity data portions.

In some implementations, the processor is further configured to form a plurality of other stripes for the first parity data, and perform an X-dimensional RAID encode operation on the first parity data to generate parity data of the first parity data.

In some implementations, the processor is further configured to, in response to a read operation failed, perform an X-dimensional RAID decode operation on the memory data and respective X-dimensional parity data in the second parity data and recover a compromised data portion in the memory data based on the memory data and respective X-dimensional parity data. In response to recovering the memory data using the X-dimensional RAID decode operation being successful, the processor is further configured to read out the memory data. In response to recovering the memory data using the X-dimensional RAID decode operation failed, the processor is further configured to notify a host.

In some implementations, the processor is further configured to perform an X-dimensional RAID decode operation on the first parity data and respective parity data in the second parity data and recover a compromised parity data portion in the first parity data based on first parity data and respective parity data in the second parity data. In response to recovering the first parity data using the X-dimensional RAID decode operation being successful, the processor is configured to send recovered first parity data to the host. In response to recovering the first parity data using the X-dimensional RAID decode operation failed, the processor is configured to notify the host.

Another aspect of the present disclosure provides a host. The host has a processor and a memory and is operatively coupled to a plurality of memory cells for storing memory data. The memory cells are coupled to a plurality of word lines arranged in a plurality of rows. The processor is configured to receive memory data, perform a RAID encode operation on the memory data to form parity data, and transmit the memory data and the parity data to a memory controller operatively coupled to the plurality of memory cells.

In some implementations, the RAID encode operation includes at least one of a Y-dimensional RAID encode operation or a Z-dimensional RAID encode operation. The parity data includes at least one of a Y-dimensional parity data or a Z-dimensional parity data.

In some implementations, the processor is further configured to divide the memory data into K data parts each comprising a plurality of data portions arranged in I rows and J columns, K being a number of data portions corresponding to each parity data portion in the Z-dimensional RAID encode operation. Data portions in each of the I rows correspond to a same position in memory cells coupled to every other word line. Data portions in each of the J columns correspond to memory cells in two adjacent word lines.

In some implementations, the processor is further configured to form K sets of first stripes, each of the K sets comprising J first stripes, each of the J first stripes corresponding to a respective one of the J columns. In some implementations, the processor is further configured to perform the Y-dimensional RAID encode operation includes, for each of J first stripes in each of the K sets, generating a respective first parity data portion.

In some implementations, the processor is further configured to form I×J sets of third stripes, each of the I×J sets comprising K data portions each comprising data portions having a same row number and a same column number in each of the K data parts. In some implementations, the processor is further configured to perform the Z-dimensional RAID encode operation includes, for each of the I×J sets of third stripes, generating a respective third parity data portion.

In some implementations, I is equal to a total number of the data portions stored in the memory cells coupled to the two adjacent word lines.

In some implementations, the processor is further configured to receive the parity data and the memory data and determine whether the parity data includes a compromised parity data portion. In response to the parity data having no compromised parity data portion, the processor is further configured to perform at least one of a Y-dimensional RAID decode operation or a Z-dimensional RAID decode operation on the parity data and the memory data. In response to the parity data having a compromised parity data portion, the processor is further configured to notify a controller to recover the compromised parity data portion.

In some implementations, the processor is further configured to perform the at least one of the Y-dimensional RAID decode operation or the Z-dimensional RAID decode operation on recovered parity data and the memory data.

Another aspect of the present disclosure provides a method for operating a memory apparatus using RAID. The apparatus includes a plurality of memory cells stored with memory data, a memory controller operatively coupled to the memory cells, and a host operatively coupled to the memory controller. The method includes: performing, by the host, a first RAID encode operation on memory data to form first parity data; transmitting the first parity data and the received memory data to the memory controller; and performing, by the memory controller, a second RAID encode operation on the first parity data and the received memory data to form second parity data.

In some implementations, performing the first RAID encode operation includes performing at least one of a Y-dimensional RAID encode operation or a Z-dimensional RAID encode operation.

In some implementations, performing the second RAID encode operation includes performing an X-dimensional RAID encode operation.

In some implementations, the method further includes dividing, by the host, the memory data into K data parts each comprising a plurality of data portions arranged in I rows and J columns, K being a number of data portions corresponding to each parity data portion in the Z-dimensional RAID encode operation. Data portions in each of the I rows correspond to a same position in memory cells coupled to every other word line. Data portions in each of the J columns correspond to memory cells in two adjacent word lines.

In some implementations, the method further includes, in response to a failed read operation on the memory data, performing, by the memory controller, an X-dimensional RAID decode operation on the memory data and the second parity data.

In some implementations, the method further includes, in response to a failed recovering operation on the memory parity data using the X-dimensional RAID decode operation, performing, by the host, at least one of a Y-dimensional RAID decode operation or a Z-dimensional RAID decode operation.

The foregoing description of the specific implementations can be readily modified and/or adapted for various applications. Therefore, such adaptations and modifications are intended to be within the meaning and range of equivalents of the disclosed implementations, based on the teaching and guidance presented herein. The breadth and scope of the present disclosure should not be limited by any of the above-described exemplary implementations, but should be defined only in accordance with the following claims and their equivalents.

What is claimed is:

1. A memory system, comprising:
a memory device configured to store memory data, the memory device comprising:
an array of memory cells; and
a plurality of word lines arranged in a plurality of rows and coupled to the array of memory cells; and
a memory controller coupled to the array of memory cells, and configured to:
receive the memory data and first parity data of the memory data, the first parity data being received from a host, the first parity data being parity data of the memory data in two dimensions, and the first parity data being formed based on a two-dimensional redundant array of independent disks (RAID) encode operation performed on the memory data by the host;

perform a one-dimensional RAID encode operation on the memory data and the first parity data to form second parity data, the second parity data being parity data of the memory data in one dimension different from the two dimensions; and perform a write operation to store the memory data, the first parity data, and the second parity data into the array of memory cells.

2. The memory system of claim 1, wherein the first parity data comprises a Y-dimensional parity data and a Z-dimensional parity data, and the second parity data comprises an X-dimensional parity data.

3. The memory system of claim 2, wherein the memory data comprises K data parts each comprising a plurality of data portions arranged in I rows and J columns, K being a number of data portions corresponding to each parity data portion in the Z-dimensional parity data;

data portions in each of the I rows correspond to a same position in memory cells coupled to every other word line; and data portions in each of the J columns correspond to memory cells in two adjacent word lines.

4. The memory system of claim 3, wherein the memory controller is further configured to, for the memory data, form K sets of stripes, each of the K sets comprising I stripes each corresponding to a respective one of the I rows in each of the K data parts;

for each of the K sets of stripes, perform an X-dimensional RAID encode operation to generate I parity data portions each corresponding to a respective one of the I stripes; and form K×I parity data portions.

5. The memory system of claim 2, wherein the memory controller is further configured to, in response to a read operation failure, perform an X-dimensional RAID decode operation on the memory data and respective X-dimensional parity data in the second parity data;

recover a compromised data portion in the memory data based on the memory data and respective X-dimensional parity data;

in response to recovering the memory data using the X-dimensional RAID decode operation being successful, read out the memory data; and in response to recovering the memory data using the X-dimensional RAID decode operation failed, notify a host.

6. A system, comprising:

a memory device configured to store memory data, the memory device comprising:

an array of memory cells; and a plurality of word lines arranged in a plurality of rows and coupled to the array of memory cells;

a memory controller coupled to the array of memory cells; and a host, comprising a processor coupled to the memory controller and configured to perform a two-dimensional redundant array of independent disks (RAID) encode operation on the memory data to form first parity data, the first parity data being parity data of the memory data in two dimensions, wherein the memory controller is configured to receive the first parity data and the memory data, and perform a one-dimensional RAID encode operation on the first parity data and the memory data to form second parity data, the second parity data being parity data of the memory data in one dimension different than the two dimensions.

7. The system of claim 6, wherein the host further comprises a memory coupled to the processor and configured to store the first parity data.

8. The system of claim 6, wherein the memory controller is further configured to perform a write operation to store the first parity data, the second parity data, and the memory data into the array of memory cells.

9. The system of claim 6, wherein the two-dimensional RAID encode operation comprises a Y-dimensional RAID encode operation and a Z-dimensional RAID encode operation.

10. The system of claim 9, wherein the one-dimensional RAID encode operation comprises an X-dimensional RAID encode operation.

11. The system of claim 10, wherein the processor is further configured to divide the memory data into K data parts each comprising a plurality of data portions arranged in I rows and J columns, K being a number of data portions corresponding to each parity data portion in the Z-dimensional RAID encode operation;

data portions in each of the I rows correspond to a same position in memory cells coupled to every other word line; and data portions in each of the J columns correspond to memory cells in two adjacent word lines.

12. The system of claim 11, wherein the processor is further configured to form K sets of first stripes, each of the K sets comprising J first stripes; and each of the J first stripes corresponds to a respective one of the J columns.

13. The system of claim 12, wherein the first parity data comprises K×J first parity data portions; and the memory controller is further configured to:

arrange the K×J first parity data portions into K rows and J columns, each of the K rows comprising J first parity data portions of respective one of the K sets; and form K second stripes, each corresponding to a respective one of the K rows of first parity data portions.

14. The system of claim 13, wherein, to perform the one-dimensional RAID encode operation, the memory controller is configured to:

perform the X-dimensional RAID encode operation to generate a set of K second parity data portions, each of the K second parity data portions corresponding to a respective one of the K second stripes.

15. A method for operating a system, comprising:

performing, by a host of the system, a first redundant array of independent disks (RAID) encode operation on memory data to form first parity data, the first parity data being parity data of the memory data in two dimensions;

transmitting the first parity data and received memory data to a memory controller of the system, the memory controller being operatively coupled to a plurality of memory cells; and performing, by the memory controller, a second RAID encode operation on the first parity data and the received memory data to form second parity data, the second parity data being parity data of the memory data in one dimension different than the two dimensions.

16. The method of claim 15, wherein
performing the first RAID encode operation comprises performing a Y-dimensional RAID encode operation and a Z-dimensional RAID encode operation; and
performing the second RAID encode operation comprises performing an X-dimensional RAID encode operation.

17. The method of claim 16, further comprising:
dividing, by the host, the memory data into K data parts each comprising a plurality of data portions arranged in I rows and J columns, K being a number of data portions corresponding to each parity data portion in the Z-dimensional RAID encode operation, wherein
data portions in each of the I rows correspond to a same position in memory cells coupled to every other word line; and
data portions in each of the J columns correspond to memory cells in two adjacent word lines.

18. The method of claim 17, further comprising, for the memory data,
forming K sets of stripes, each of the K sets comprising I stripes each corresponding to a respective one of the I rows in each of the K data parts;
for each of the K sets of stripes, performing an X-dimensional RAID encode operation to generate I parity data portions each corresponding to a respective one of the I stripes; and
forming K×I parity data portions.

19. The method of claim 15, further comprising, in response to a failed read operation on the memory data, performing, by the memory controller, an X-dimensional RAID decode operation on the memory data and the second parity data.

20. The method of claim 19, further comprising, in response to a failed recovering operation on the memory data using the X-dimensional RAID decode operation, performing, by the host, at least one of a Y-dimensional RAID decode operation or a Z-dimensional RAID decode operation.

* * * * *